Figure 1:
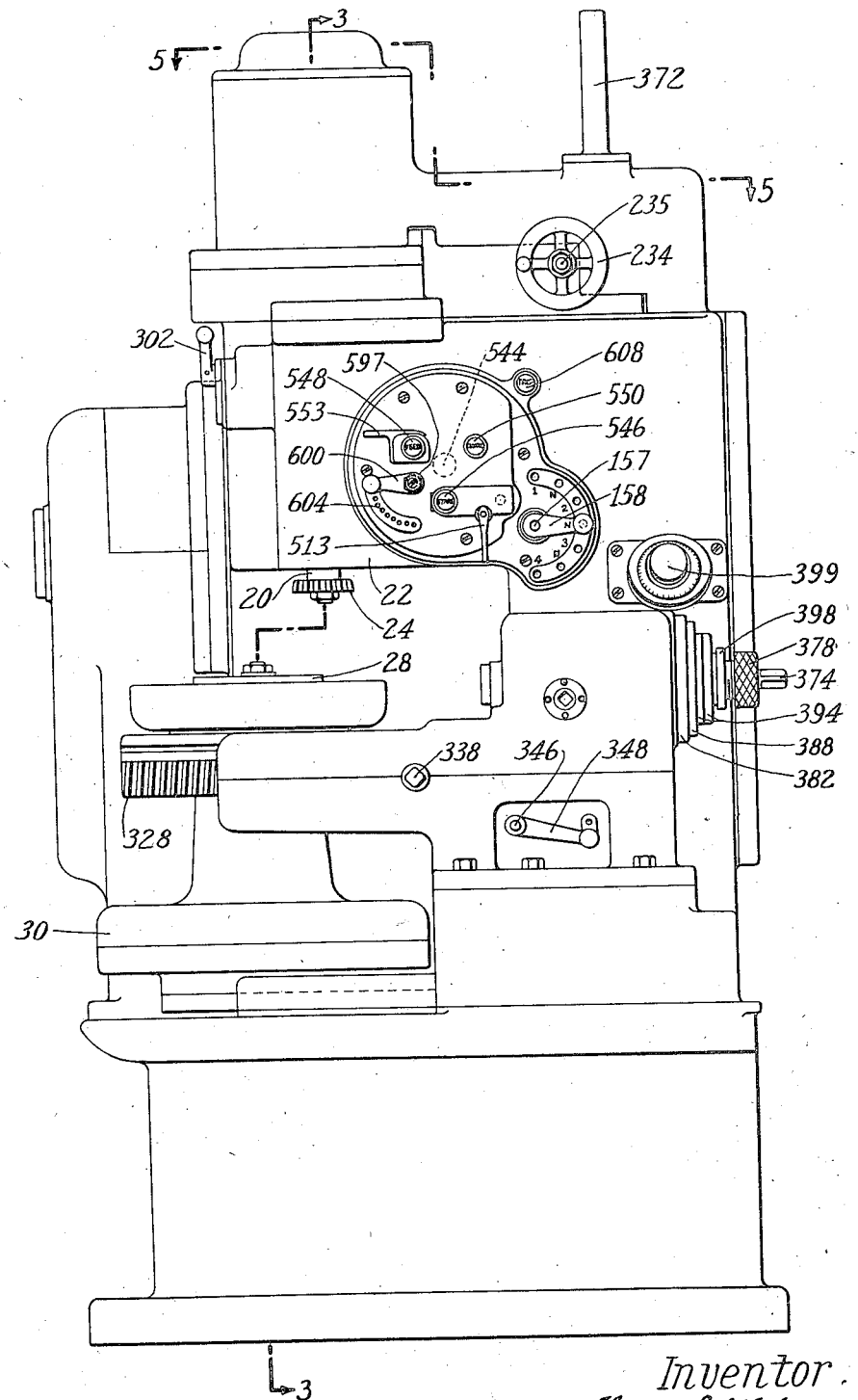

Dec. 24, 1935.  S. W. AVIS  2,025,035
GEAR CUTTING MACHINE
Filed Nov. 16, 1931  11 Sheets-Sheet 1

Witness
Chas. T. Olson

Inventor.
Samuel W. Avis
by Van Everen Fish
Hildreth & Cary Attys.

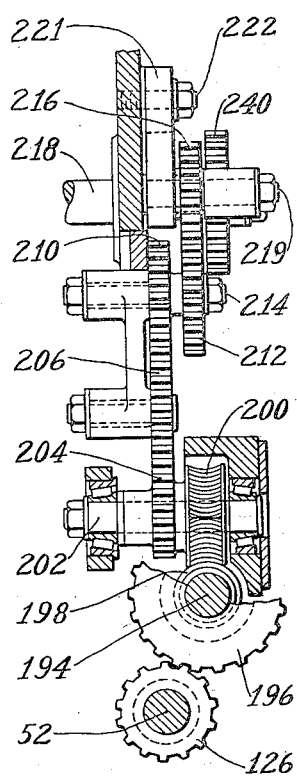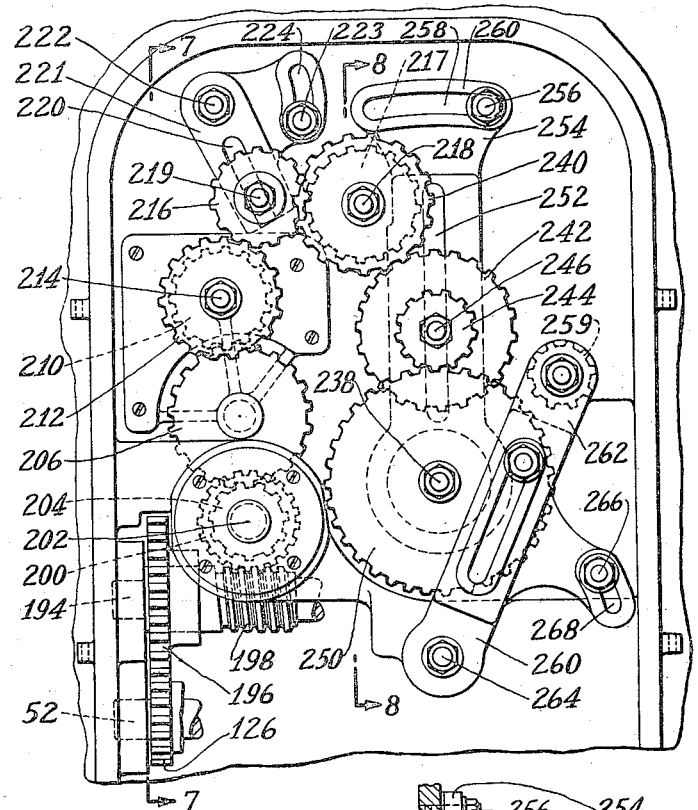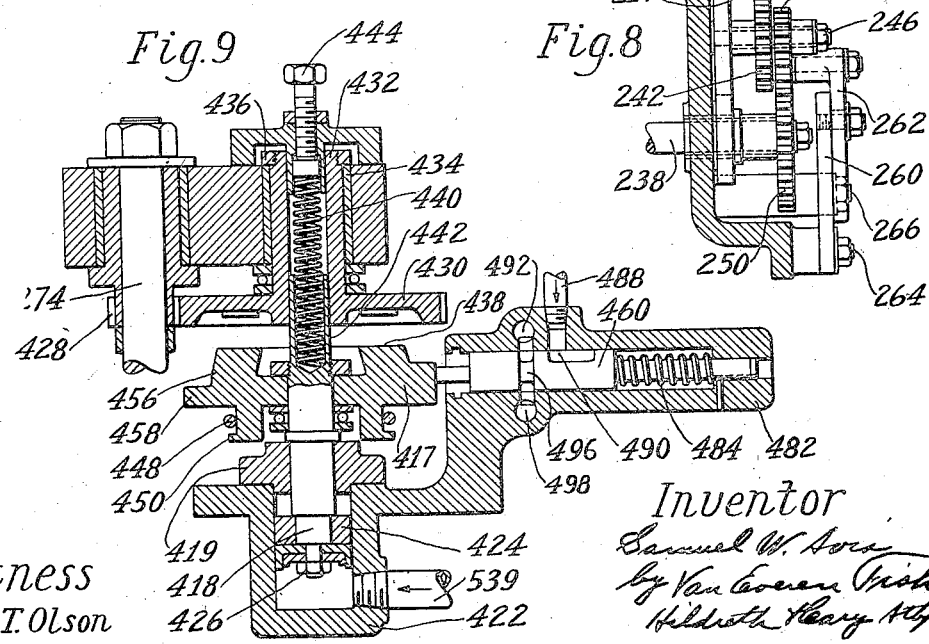

Dec. 24, 1935.   S. W. AVIS   2,025,035
GEAR CUTTING MACHINE
Filed Nov. 16, 1931   11 Sheets-Sheet 8
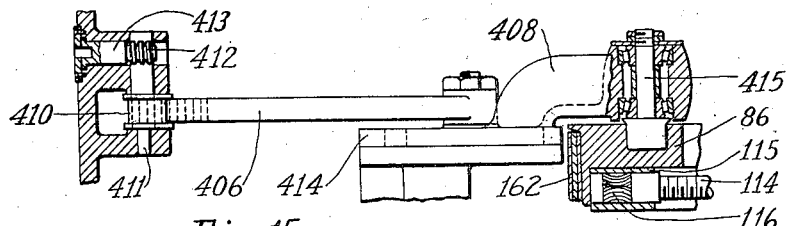
Fig.15
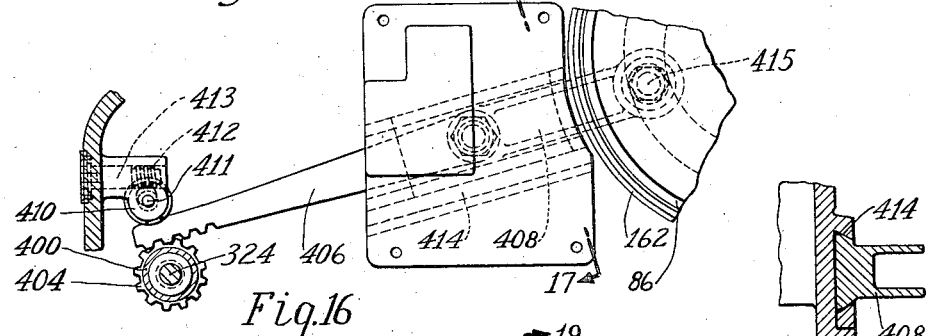
Fig.16
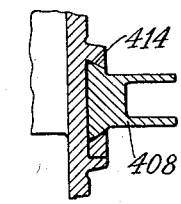
Fig.17
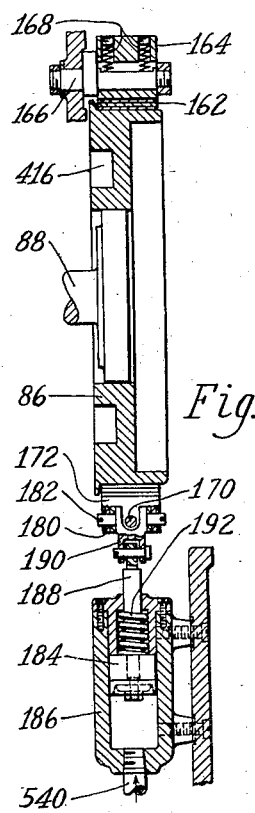
Fig.19
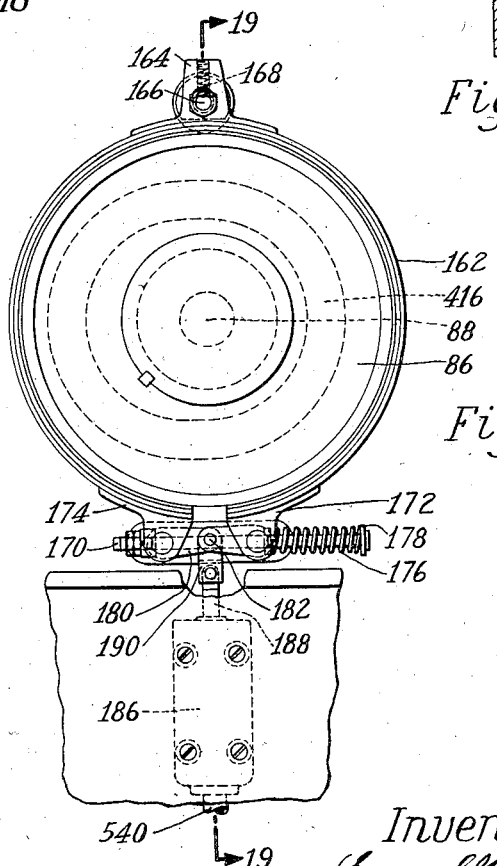
Fig.18
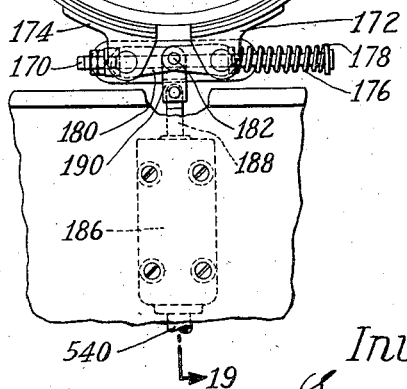
Witness
Chas. T. Olson
Inventor
Samuel W. Avis
by Van Everen Fish
Hildreth & Bary Attys.

Dec. 24, 1935. S. W. AVIS 2,025,035
GEAR CUTTING MACHINE
Filed Nov. 16, 1931 11 Sheets-Sheet 10

Witness
Chas. T. Olson

Inventor
Samuel W. Avis

Dec. 24, 1935.  S. W. AVIS  2,025,035
GEAR CUTTING MACHINE
Filed Nov. 16, 1931  11 Sheets-Sheet 11

Witness
Chas. T. Olson

Inventor
Samuel W. Avis
by Van Everen Fish
Hildreth Heary Attys

Patented Dec. 24, 1935

2,025,035

UNITED STATES PATENT OFFICE 2,025,035

GEAR CUTTING MACHINE

Samuel W. Avis, Providence, R. I., assignor to Brown and Sharpe Manufacturing Company, a corporation of Rhode Island Application November 16, 1931, Serial No. 575,232

37 Claims. (Cl. 90—9)

The invention relates to gear cutting machines, and is herein disclosed as embodied in a machine of the general type employing a gear shaped planing cutter and a work spindle which are given relative reciprocatory movements to impart a translatory cutting movement to the cutter across the face of a circular gear blank supported on the spindle, and relative rotational movements to maintain a substantially equal peripheral speed between the cutter and the gear blank at the point of cutting contact, and are relatively movable laterally of the reciprocatory cutting movement to impart the required relative feeding and relieving movements to the cutter and the gear blank.

The machine herein illustrated and described as embodying the several features of the present invention, is intended as an improvement on the machine shown and described in the inventor's copending application Serial No. 546,231, filed June 23, 1931.

One feature of the present invention contemplates the provision of a novel and improved mechanism for imparting the feeding and relieving movements to the work support, which will be sturdy in construction and accurate in operation.

When for any reason it is found necessary to move the work support away from or toward the cutter of a machine of the type to which the present invention relates, the parts must be returned by the operator to the exact operating positions previously occupied, and it is desirable that this be done with a minimum loss of time. Another feature of the invention therefore contemplates the provision of mechanism for enabling the operator to shift the work support and restore it to its correct working position with exactness and rapidity.

Certain other features of the invention relate to improvements in the fluid pressure control system with a view to simplifying and improving the construction and arrangement of the parts, and enabling the operator more readily to control the operation of the machine.

Figure 2:
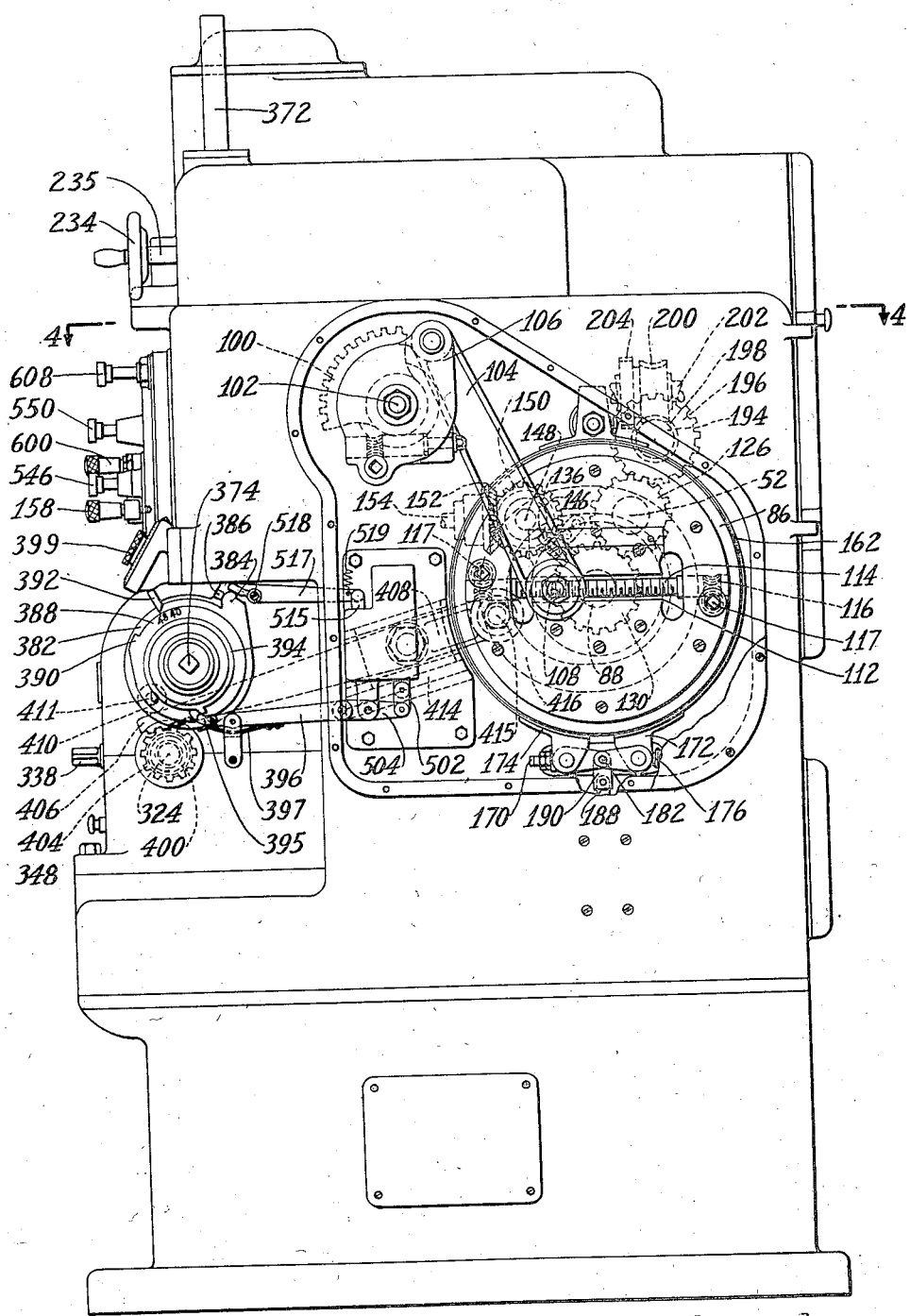
Figure 3:
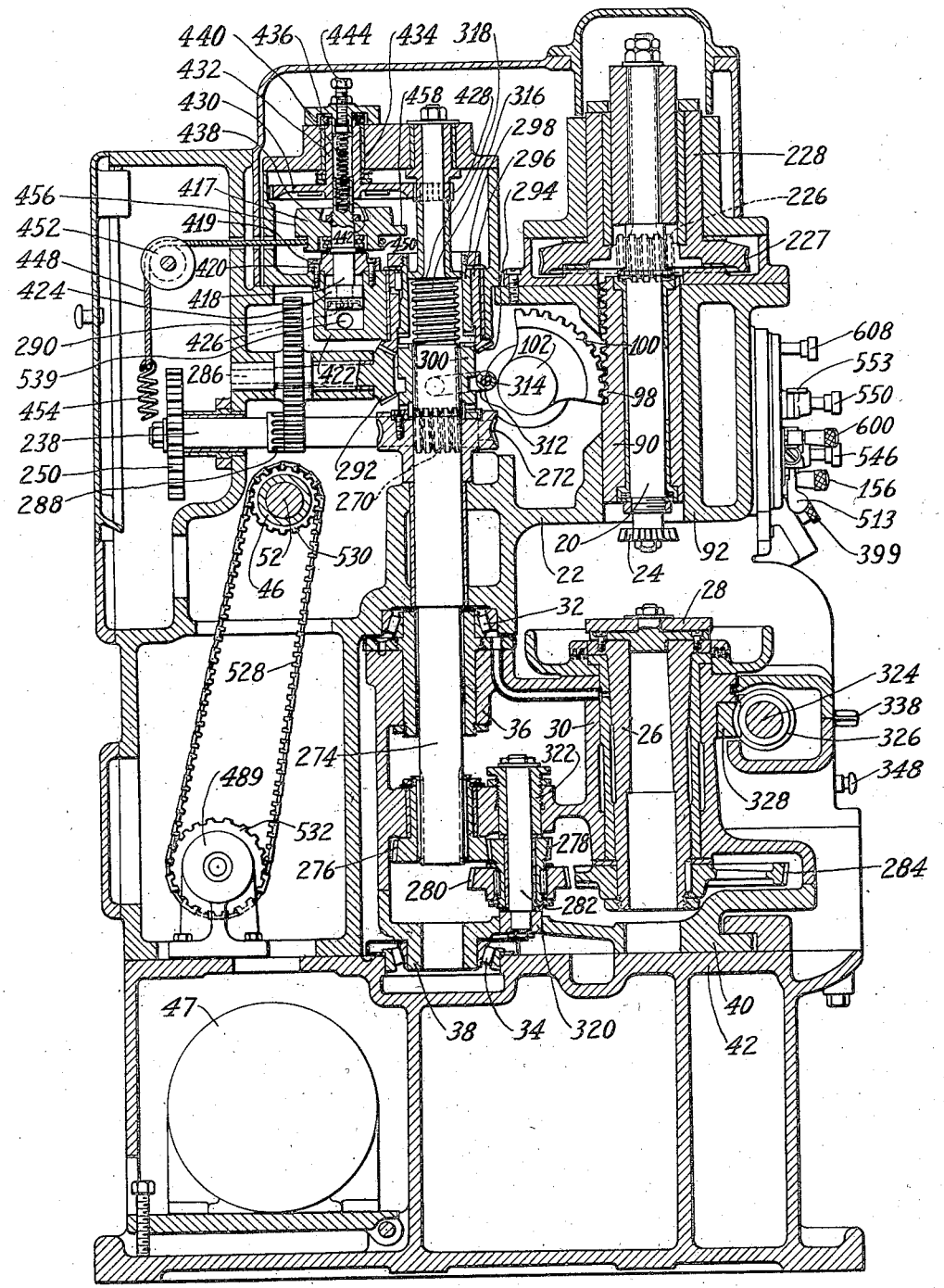
Figure 4:
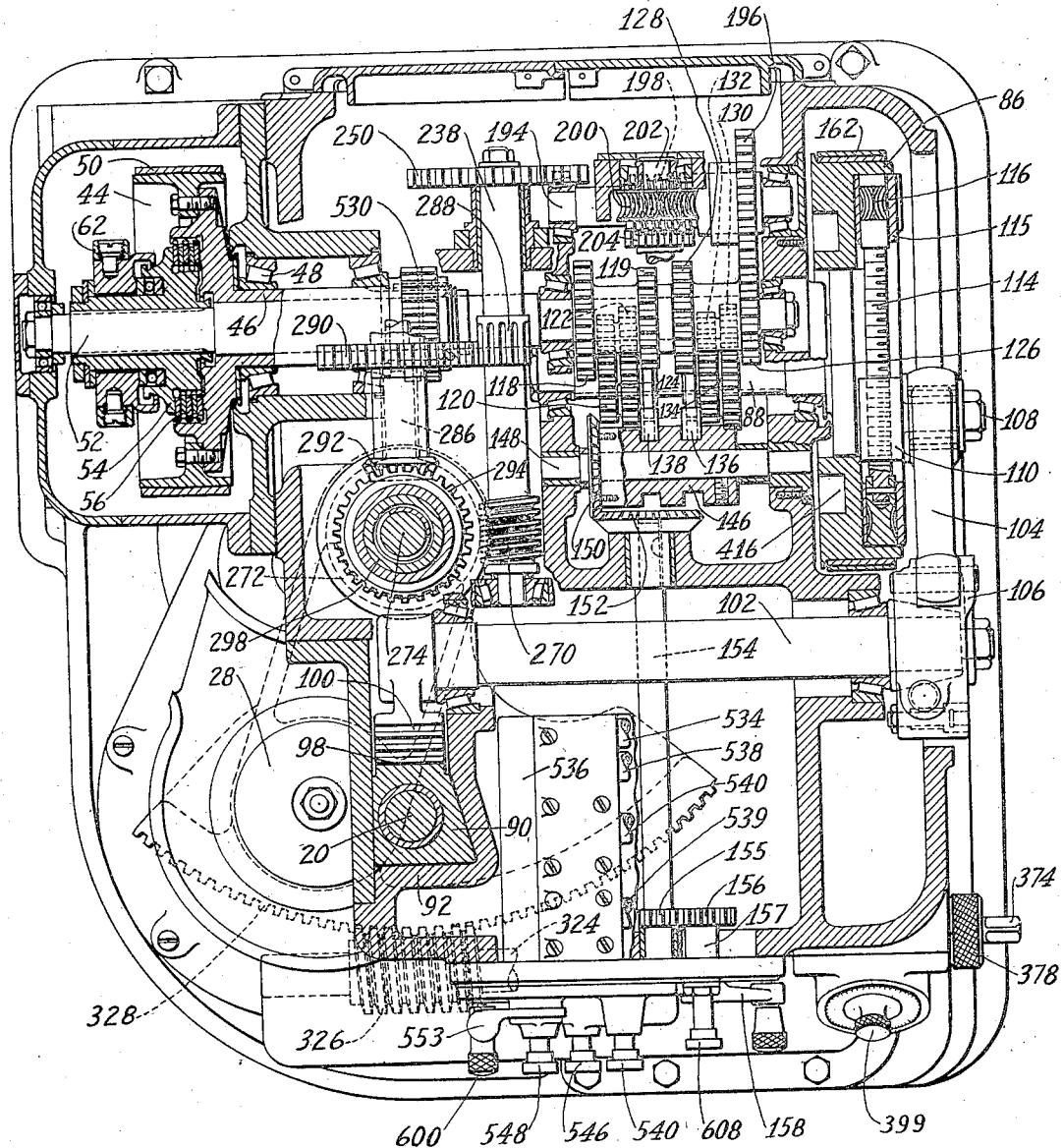
Figure 5:
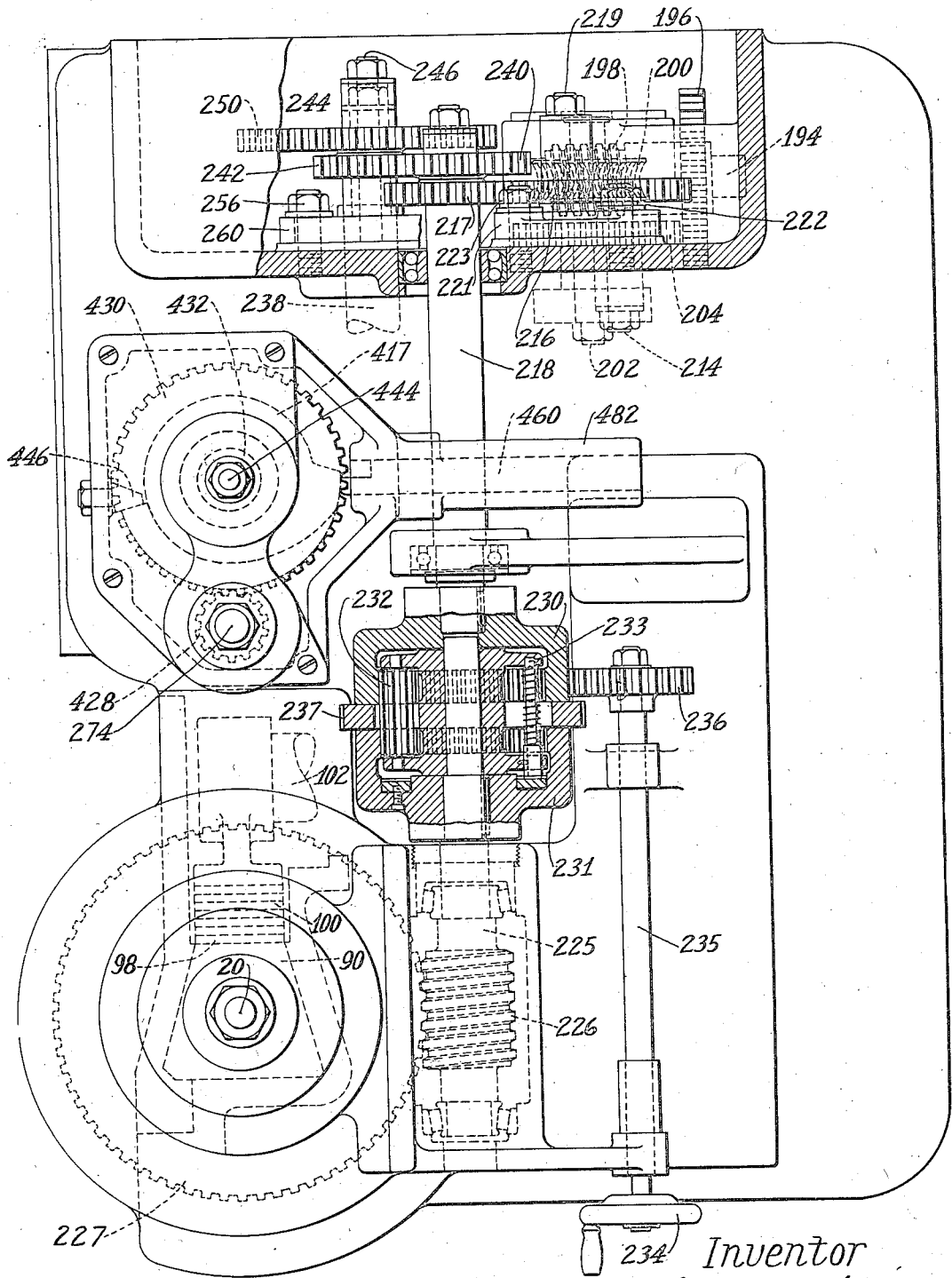
Figure 10:
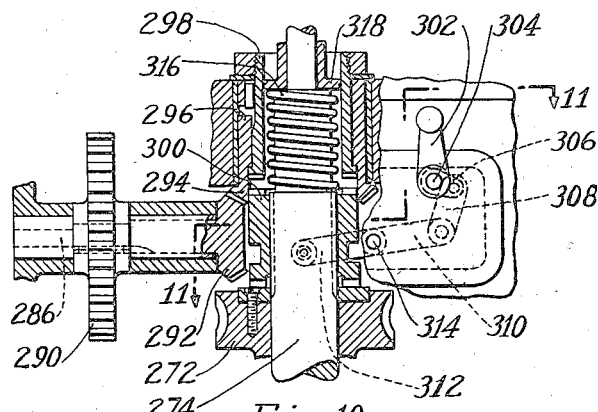
Figure 11:
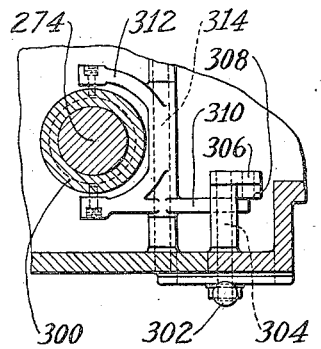
Figure 12:
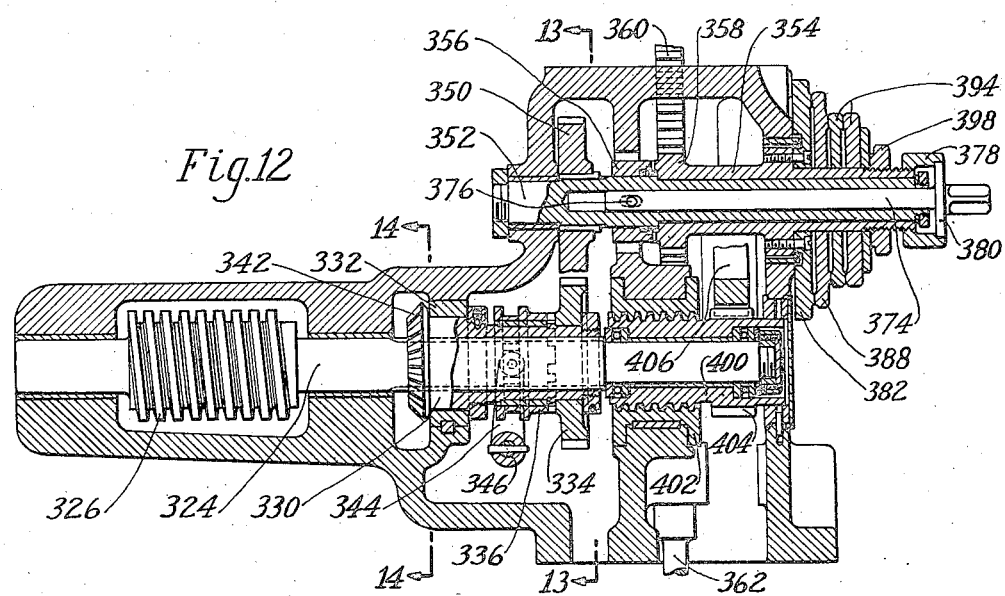
Figure 13:
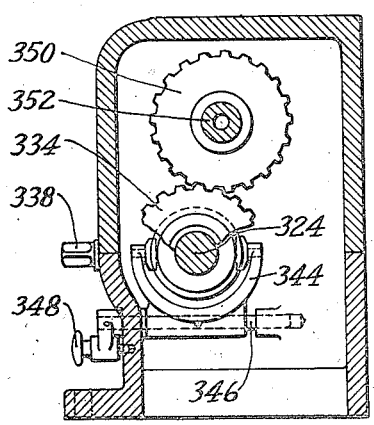
Figure 14:
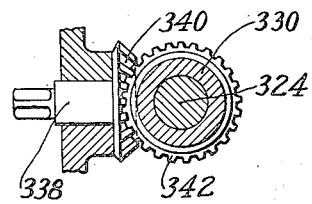
Figure 20:
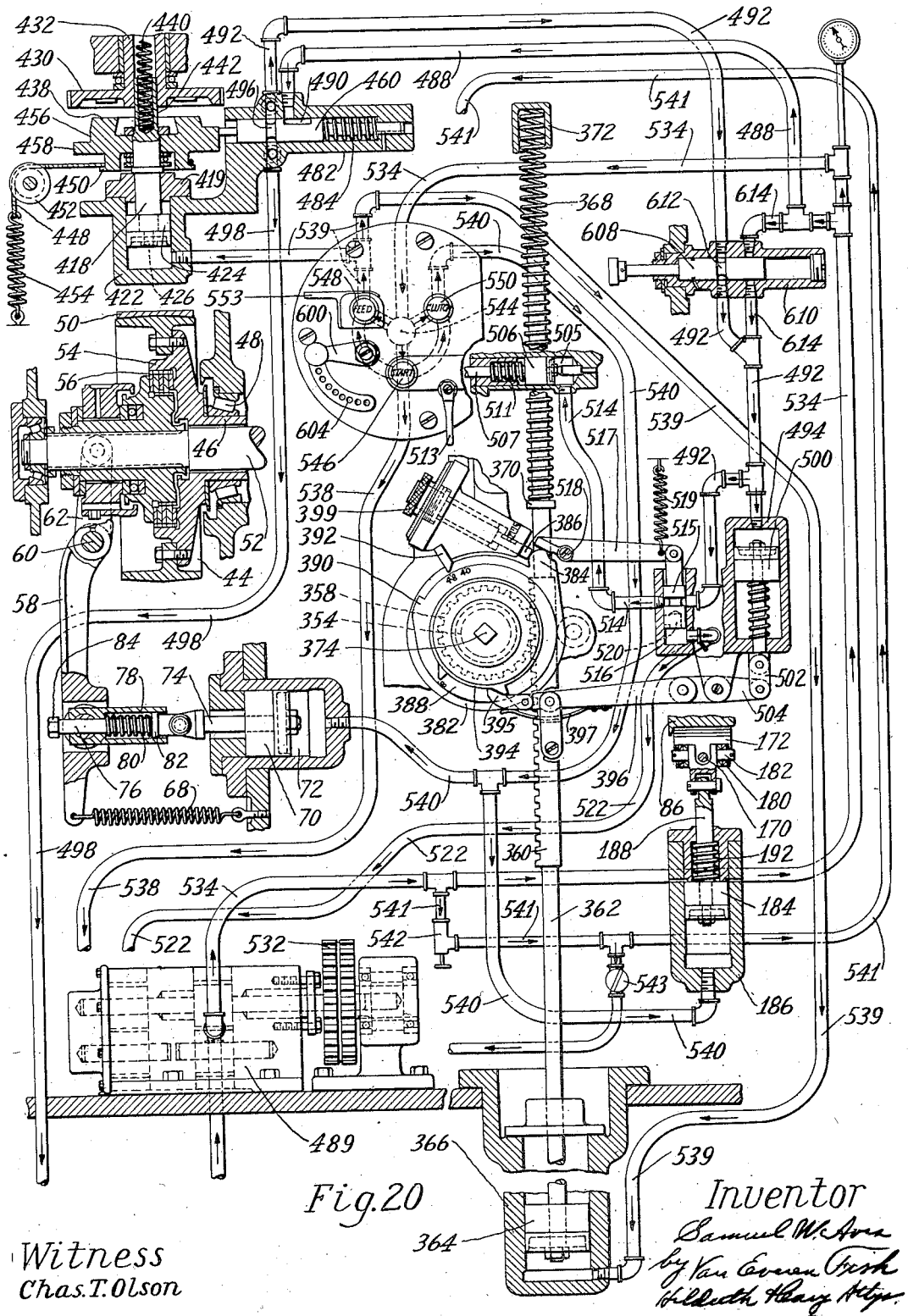
Figure 21:
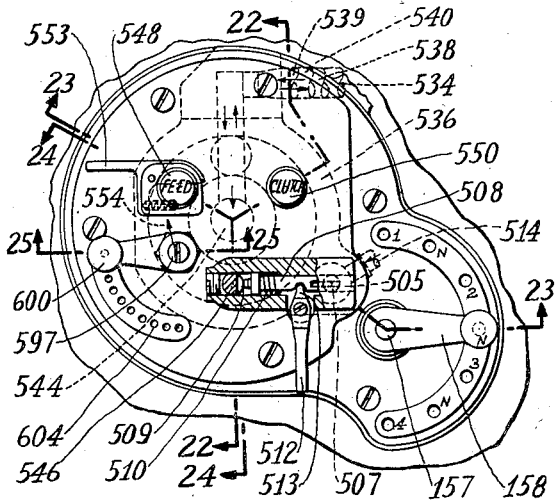
Figure 22:
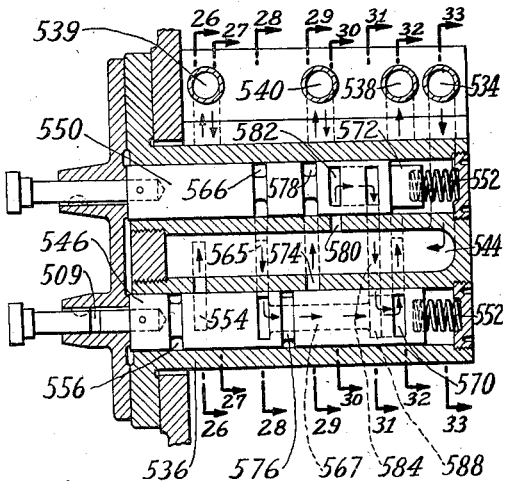
Figure 23:
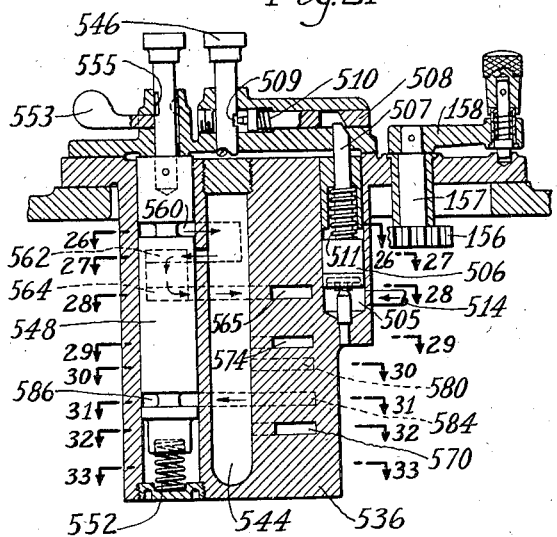
Figure 24:
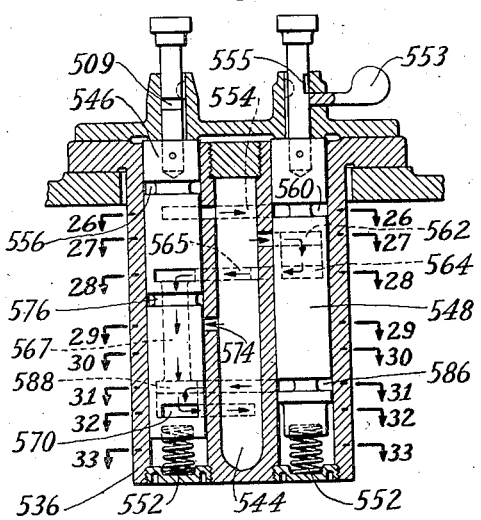
Figure 25:
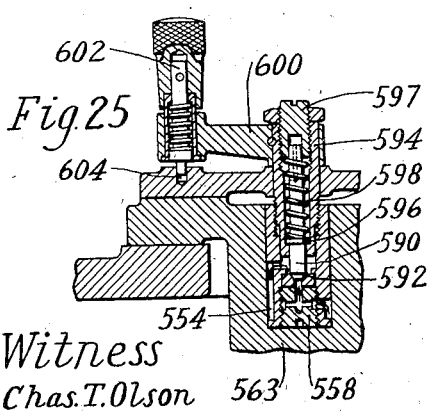

Other features of the invention consist in the devices, combinations and arrangement of parts hereinafter described and claimed, which together with the advantages to be obtained thereby will be readily understood by one skilled in the art from the following description taken in connection with the accompanying drawings, which illustrate a machine embodying the several features of the invention in their preferred form and in which Fig. 1 is a front view of the machine; Fig. 2 is a view in right side elevation of the machine; Fig. 3 is a sectional view of the machine looking from the left, taken on the line 3—3 of Fig. 1; Fig. 4 is a sectional plan view taken on the line 4—4 of Fig. 2; Fig. 5 is a plan view partly in section and with parts broken away to show underlying parts, taken on the line 5—5 of Fig. 1; Fig. 6 is a detail view, looking from the rear, of the take-off or change speed gear mechanism for determining the relative rotational speed of the cutter and work support; Fig. 7 is a view taken on the line 7—7 of Fig. 6; Fig. 8 is a detail view taken on the line 8—8 of Fig. 6; Fig. 9 is a detail view partly in section of the timing mechanism on a large scale; Fig. 10 is a detail view partly in section of the clutch mechanism through which the work support is driven at a relatively high speed; Fig. 11 is a view taken on the line 11—11 of Fig. 10; Fig. 12 is a detail view partly in section of the feeding and relieving mechanisms on a large scale; Fig. 13 is a view taken on the line 13—13 of Fig. 12; Fig. 14 is a detail sectional view taken on the line 14—14 of Fig. 12; Fig. 15 is a detail view of the relieving rack; Fig. 16 is a view in side elevation of the parts shown in Fig. 15; Fig. 17 is a detail of construction taken on the line 17—17 of Fig. 16; Fig. 18 is a detail view of the fly wheel and brake mechanism; Fig. 19 is a sectional view taken on the line 19—19 of Fig. 18; Fig. 20 is a somewhat diagrammatic view showing the various hydraulic connections controlling the operation of the machine; Fig. 21 is a detail view in front elevation of the valve mechanism for starting and stopping the machine; Fig. 22 is a sectional view taken on the line 22—22 of Fig. 21; Fig. 23 is a sectional view taken on the line 23—23 of Fig. 21; Fig. 24 is a sectional view taken on the line 24—24 of Fig. 21; Fig. 25 is a detail sectional view taken on the line 25—25 of Fig. 21, showing particularly the feed regulating valve; and Figs. 26 to 33 inclusive are detail sectional views of the valve mechanism taken on corresponding lines of Figs. 22, 23 and 24.

In the machine herein disclosed as embodying in a preferred form the several features of the present invention, the cutter spindle is mounted for vertical reciprocatory and rotary movements in fixed bearings in the machine frame as in the machine of the application hereinbefore referred to, and cooperates as in said machine with a work spindle mounted for rotary movements on a support or apron which is moved about a fixed pivot to impart the required feeding and relieving movements to the gear blank with relation to the reciprocating cutter.

In order to provide a sturdy and dependable mechanism which will operate with a high degree of accuracy and certainty to impart the required feeding and relieving movements to the work support and gear blank mounted thereon, the present construction includes a rotatable feed shaft and connections to the work support including a worm and worm gear. The feed shaft is rotated to impart the required feeding movements to the work support and gear blank mounted thereon by an auxiliary feed shaft which is driven by hydraulic pressure and is controlled by means of a dial mechanism similar to that disclosed in said application, to cause preliminary cuts of intermediate depth to be made around the entire circumference of the gear blank and finally to feed the work into a predetermined depth for the final or finishing cut. Clutch connections are provided to enable the operator manually to adjust the dial mechanism in relation to the hydraulic drive members in setting up the machine.

Endwise movements are imparted to the feed shaft to impart the required relieving movements to the work through mechanism which includes a nut rigidly secured to the machine frame and arranged to receive a correspondingly threaded sleeve member which is rotatably mounted on the feed shaft and is secured against lengthwise movement relatively thereto by end thrust bearings on the shaft. The threaded sleeve member is oscillated to relieve the work from the cutter by means of a cam actuated rack engaging with an external gear on the sleeve.

As in the machine of the inventor's copending application above referred to, the present machine is provided with a fluid pressure control system for starting and stopping the machine and for feeding the work into depth. With the present construction, the application of the hydraulic system has been extended to reduce so far as possible the number of mechanical parts and to provide a more compact and efficient mechanism.

For starting and stopping the machine, two separate hydraulically operated pistons are provided which are actuated simultaneously upon opening the starting valve to release the brake and close the machine clutch, and upon closing the starting valve are actuated to permit the machine clutch to move to open position and the brake to be set to stop the machine.

For feeding the work into depth, a feed rack is provided as in the machine of the application, which is actuated by means of a piston sliding in a pressure chamber, and connections from the pump including a needle valve adjustable to determine the rate of feed. The work is fed inwardly during the rotation of the cutter and work blank until the feed is arrested by the engagement of a preliminary stop lever with a corresponding abutment carried by one of the dials forming a part of the feed stopping mechanism, and the cutting operation is then carried from this point entirely around the gear blank to finish the preliminary cut. Also as in the machine of the application, a timing mechanism is provided to remove the preliminary stop lever out of engagement with the abutment on the corresponding preliminary stop dial, and permit the continued feed of the work after the completion of the preliminary cut. In the present construction, the timing cam is arranged to open a hydraulic valve, causing liquid under pressure to be supplied to a pressure cylinder arranged to trip the preliminary stop. After the work has been finally fed into depth and the cutting operation has been carried again completely around the blank to finish the forming of the gear, liquid under pressure is supplied through the action of the timing mechanism and valve above described to a pressure chamber to cause the starting valve to move to closed position to stop the machine.

Referring to the drawings, the gear cutting machine herein disclosed as embodying in a preferred form the several features of the present invention comprises a rotatable cutter spindle 20 vertically mounted in the machine frame 22 and provided at its lower end with a gear-shaped planing cutter 24. A rotatable work spindle 26 for supporting a circular gear blank 28 is mounted to cooperate with the cutter in a support 30 which is arranged to swing laterally about a fixed pivot which comprises the bearings 32 and 34 arranged to receive corresponding axle posts or trunnions 36 and 38 formed on the support 30. The support 30 has formed on its under side a bearing surface 40 which engages at all times with the corresponding arcuate way 42 formed in the base of the machine. The work support 30 is moved about its pivot to impart feeding movements to the work into engagement with the cutter, and is also actuated in timed relation to the reciprocating stroke of the cutter to impart relieving movements to the work.

The driving mechanism from which power is supplied for imparting relative rotational movements to the cutter and work spindle to maintain a substantially equal peripheral speed at the point of cutting contact, for imparting the vertical reciprocatory cutting movements to the cutter and the cutter spindle, and for moving the support 30 about its pivot to impart the required feeding and relieving movements to the work blank, comprises a pulley 44 which is formed on one end of a sleeve 46 journaled in bearings 48 in the machine and continuously driven from a motor 47 in the base of the machine by means of a belt 50. Journaled within the sleeve and arranged to turn independently thereof is a driving shaft 52 which carries a multiple disk clutch member 54 keyed to turn with the shaft and slidable lengthwise thereof to bring the clutch disks into engagement with the corresponding clutch disks 56 formed within the base of the pulley 44.

The connections for moving the clutch member 54 into and out of operative engagement with the pulley 44 for starting and stopping the machine, (see Figs. 4 and 20) comprise a clutch actuating lever 58 which is pivoted at 60 to the machine frame, and at its upper end is provided with a yoke 62 which is pivotally connected to a band or ring 64 mounted to turn in a corresponding groove formed on the movable clutch member 54. A tension spring 68 stretched between the lower end of the clutch lever 58 and a point on the machine frame tends to maintain the clutch normally in its open or disconnected position. The clutch lever 58 is moved about its pivot 60 against the pressure of its spring 68 to throw the machine into operation by means of a piston 70 arranged to slide in a liquid pressure cylinder 72 to which liquid under pressure is supplied from the hydraulic control system for the machine hereinafter to be described. The piston 70 is provided with a stem 74 which extends outwardly through the end of the chamber, and is connected to move the lever 58 through a resilient link connection comprising a shaft 76 which is pivotally secured to the end of the stem 74, and is arranged for limited movement in a sleeve 78 pivotally secured to the lever 58. A compression spring 80 coiled about the shaft 76 between a collar 82 secured thereto and an abutting shoulder on the sleeve 78, tends to maintain the link connection in its extended position. A nut 84 screw threaded to the end of the shaft 76 engages with the end of the sleeve 78 to limit the rearward movement of the shaft 76 and piston 70 under the pressure of the spring 80. As liquid is supplied under pressure from the hydraulic control system upon opening the starting valve, the piston 70 is advanced causing the clutch lever 58 to be moved about its pivot under the influence of the relatively heavy springs 80 against the pressure of the spring 68 to close the clutch and to hold it in closed position under a constant spring pressure.

Vertical reciprocatory movements are imparted to the cutter spindle 20 and cutter 24 from the driving shaft 52 through connections which comprise a flywheel 86 (see Figs. 2, 3, 4 and 5) secured on a shaft 88 mounted in a parallel relationship to and beneath the driving shaft 52. The connections from the flywheel 86 for actuating the spindle comprise a slide 90 mounted for vertical movement in ways 92 in the machine and journaled to receive the cutter spindle 20 which is permitted to turn freely with relation to the slide, but is prevented from endwise movement relatively thereto by means of the bearing members 94 and 96 secured to the cutter spindle 20 respectively at each end of the slide 90. A rack 98 formed in the slide 90 engages with a corresponding gear segment 100 which is rigidly secured to one end of a rock shaft 102 extending horizontally across the machine. The rock shaft is given a reciprocatory movement to advance and retract the cutter, from the flywheel 86, through connections which include a link 104 secured at its upper end to a short lever arm 106 on the rock shaft 102 and at its lower end pivotally secured to a crank pin 108 on the flywheel 86. In order to permit a ready adjustment of the amplitude of the cutter stroke, the crank pin 108 is carried on a slide 110 which may be moved toward or away from the center of the flywheel along ways 112 by means of a screw threaded member 114 extending diametrically across the face of the flywheel. The screw-threaded member 114 is journaled in a flange or ring 115 which is secured in a corresponding recess formed in the face of the flywheel. For adjusting the position of the crank pin 108, the screw-threaded member 114 is provided at each end with worm wheels 116 which engage with corresponding worms 117 journaled at right angles thereto in the ring 115, and provided each with a squared end to receive an adjusting crank handle. These worm and worm wheel connections being irreversible, serve also to lock the member 114 and slide 110 in adjusted position during the operation of the machine.

In order to permit an adjustment of the speed of reciprocation of the cutter in accordance with the requirements of the work, a set of change speed gears is provided for driving the fly wheel shaft 88 at different rates of speed from the constant speed driving shaft 52. These gears as best shown in Fig. 4 of the drawings, comprise the gears 118 and 119 fixed to the driving shaft 52 arranged to engage with corresponding gears 120 and 122 formed on a sleeve 124 which is keyed to turn with the flywheel shaft 88, and the gears 126 and 128 secured to the driving shaft which are arranged to engage with the corresponding gears 130 and 132 formed on a sleeve 134 keyed to the flywheel shaft 88. The sleeve gears on the flywheel shaft are controlled to produce one of four speeds of reciprocation of the cutter by means of two shifting yokes 136 and 138 (see Fig. 4) which are controlled by cam grooves formed in the periphery of the cam drum 146 loosely mounted to turn on a shaft 148. A bevel gear 150 secured at one end of the drum 146 is arranged to engage with a corresponding bevel gear 152 on a forwardly extending control shaft 154 which is connected at its forward end through gears 155 and 156 to a short crank shaft 157 provided with a manually operable control lever 158 to enable the operator quickly and accurately to secure the required adjustment of the speed of reciprocation of the cutter.

In order to bring the machine to a quick stop after the clutch member 54 has been thrown out to stop the machine, a braking mechanism is provided which acts automatically on disconnecting the driving clutch to arrest the continued rotation of the flywheel 86 within as short a compass as possible. This mechanism as shown in Figs. 18, 19 and 20, comprises a brake band 162 which extends around the periphery of the flywheel 86 and is supported intermediate its length at a point directly above the axis of the flywheel by means of a block 164 which is mounted for a slight vertical movement on a pin 166 secured to the machine frame, and is normally held in its raised position by the engagement of two compression springs 168 seated in recesses in the block. In order to exert a braking tension on the band, a rod 170 is mounted to slide in a lug 172 secured to one of the adjacent ends of the band, and is pivotally connected to a lug 174 secured on the other adjacent end of the band. A compression spring 176 coiled about the rod 170 between the lug 172 and a flange 178 on the rod 170 tends to draw the two ends of the band together to apply the required braking force. The mechanism for controlling the operation of the brake comprises two sets of toggle links 180 which are connected at their free ends respectively to the lugs 172 and 174, so that the movement of the central pivot 182 to straighten the toggle will cause a separation of the ends of the brake band 162 against the pressure of the spring 176 to release the brake, while a movement of the central pivot 182 to break the toggle will by allowing the two ends of the band to be brought together under the pressure of the spring 176, act to set the brake.

The toggle links 180 are straightened upon starting the machine to release the brake, and are then broken upon disengaging the driving clutch to stop the machine through connections comprising a piston 184 which is mounted to slide in a pressure chamber 186, and is provided with a stem 188 which extends upwardly through the cylinder casing and is connected by a link 190 with the central pivot 182 of the toggle links 180. A compression spring 192 coiled about the stem 188 and bearing at one end against the piston 184 and at its other end against the cylinder head, tends to hold the piston in a depressed position with the toggle broken to set the brake. When the main control valve is opened by the operator to start the machine as hereinafter described, liquid is introduced under pressure into the pressure cylinder 186 to raise the piston and straighten the toggle links 180 against the pressure of the compression springs 176 and 192. As the liquid pressure is cut off by the actuation of the control valve to stop the machine, the spring 192 acts to return the piston to its low position, breaking the toggle and allowing the brake to be set through the action of the spring 176.

Rotational movements are imparted to the work spindle and to the cutter spindle through connections driven by the main driving shaft 52, comprising a stub shaft 194 (see Fig. 4) which carries at one end a gear 196 permanently meshing with the gear 126 on the driving shaft, and at its other end is provided with a worm 198 to engage a corresponding worm gear 200 on a stub shaft 202. A gear 204 (see Figs. 5, 6 and 7) mounted on the stub shaft 202 engages with an idler gear 206 which is arranged to engage with a gear 210 secured to a stub shaft 214 which also carries a change speed or take-off gear 212 arranged to mesh with an idler gear 216 which in turn meshes with a corresponding change speed or take-off gear 217 on the drive shaft 218 for rotating the cutter spindle. In order to permit the substitution of gears having the necessary ratio of diameters on the stub shaft 214 and on the drive shaft 218 to produce the desired speed of rotation of the cutter and work spindle, the supporting spindle 219 for the idler gear 216 is adjustably clamped in a slot 220 formed in a bracket 221 which is pivoted at 222 to the machine frame, and is held adjustably in position by means of a clamping nut 223 extending through a slot 224 in the bracket 221.

The cutter spindle is driven from the drive shaft 218 as best shown in Figs. 2 and 5, through a shaft 225 abutting the end of the drive shaft 218 and connected to turn therewith through a mechanism which is arranged to permit an angular adjustment of the shaft 225 with relation to the drive shaft 218 by the operator to adjust the angular position of the cutter with relation to the gear blank. The shaft 225 carries a worm 226 which meshes with a corresponding worm gear 227 formed on the lower end of a sleeve 228 keyed to turn with the vertically reciprocating cutter spindle 20.

The mechanism for adjusting the angular position of the cutter spindle with relation to its driving mechanism and the gear blank is similar to the corresponding mechanism of the machine of applicant's prior application, and comprises a spider 229 loosely mounted to turn on the end of the shaft 225, and two bell-shaped members 230 and 231 overlying the spider and secured respectively to the drive shaft 218 and to the abutting shaft 225. A pinion 232 mounted on the spider is arranged to engage with each of two internal gears formed respectively on the members 230 and 231, and having a slightly different number of teeth, so that movement of the pinion relatively thereto will act to cause a slight angular movement of the shaft 225 with relation to the shaft 218. A spring-pressed plunger 233 mounted in the spider and engaging a braking surface on the bell-shaped member 231 tends to hold the spider and pinion 232 normally against any movement with relation to the two shafts. Adjustment of this mechanism may be readily effected from the front of the machine by means of a hand wheel 234 secured to the forward end of a shaft 235 which carries at its rear end a gear 236 arranged to engage with a corresponding gear 237 formed on the spider and extending outwardly between the two bell-shaped members 230 and 231. The hand wheel 234 and the shaft 235 may be moved endwise to bring the two gears 236 and 237 into and out of operative relationship for effecting this adjustment.

The work supporting spindle 26 is driven from a driving shaft 238 (see Figs. 3, 6 and 8) which is located parallel to and beneath the cutter driving shaft 218, through a set of take-off indexing gears which are selected to obtain the required speed of rotation of the work spindle relatively to the cutter in accordance with the requirements of the work to maintain a substantially equal peripheral speed at the point of contact. A take-off gear 240 mounted on the cutter driving shaft 218 adjacent the gear 216 is arranged to mesh with one of two take-off gears 242 and 244 on a stub shaft 246, the other of said gears being arranged to mesh with a gear 250 on the drive shaft 238 for imparting rotary movements to the work spindle. In order to permit an adjustment of the position of the stub shaft 246 in accordance with the size of take-off gears employed to produce the required relative rates of rotation of the cutter and the gear blank, the stub shaft 246 is adjustably clamped in a slot 252 formed in a bracket 254 which is loosely sleeved to turn on the drive shaft 238 and is clamped adjustably in position by means of a clamping member 256 extending through a slot 258 in the bracket 254. In order to permit the cutter spindle to be driven in a reverse direction with relation to the work, as for instance would be required in the cutting of an internal gear, the gear 216 may be removed and appropriate change gears 212 and 217 may be provided directly connecting the shaft 214 to drive the cutter shaft 218 in a reverse direction from that shown in Fig. 6. Since this reversal in the direction of rotation of the cutter driving shaft 218 would act also to reverse the direction of drive of the work shaft 238, mechanism is provided for reversing the direction of drive of the work shaft 238 with relation to the cutter drive shaft 218, which mechanism comprises an idler gear 259 arranged when rendered operative to engage with and rotate the gear 250 in an opposite direction from the gear 244. The idler gear 259 shown in an inoperative position in Fig. 6, is mounted for adjustment on a bearing block 260 adjustably secured to a bracket 262 which is pivoted at 264 on the machine, and is clamped adjustably in position by means of a clamping member 266 extending through a slot 268 in the bracket 262.

The drive shaft 238 is provided at its forward end with a worm 270 (see Figs. 3 and 4) which meshes with a corresponding worm gear 272 loosely sleeved on a vertical drive shaft 274 which extends downwardly through the pivot of the work support 30, and at its lower end is provided with a spur gear 276 arranged to mesh with one of two corresponding spur gears 278 and 280 which are secured to turn as a unit on a stub shaft 282 mounted on the work support and form the compensating idler through which the work spindle is driven. The other of said spur gears meshes with a corresponding spur gear 284 on the lower end of the work spindle. The spur gears 276, 278, 280 and 284 are formed slightly conical or tapering in shape in order to provide for a convenient adjustment to take up wear as hereinafter described.

With the present construction, mechanism under the control of the operator is provided as best shown in Figs. 3, 4, 10 and 11, to enable the vertical drive shaft 274 to be driven from the horizontal drive shaft 238 alternatively at the normal or at a much faster rate so that the operator may conveniently and rapidly test the concentricity of the work arbor and of the gear blank in setting up the machine. An indicator mechanism of any ordinary construction (not shown) may be utilized for this purpose. The mechanism for driving the work spindle at a rapid rate comprises a horizontal shaft 286 which is driven from the horizontal drive shaft 233 through the gears 288 and 290, and at its forward end is provided with a bevel gear 292 arranged to mesh with a corresponding bevel gear 294 on a sleeve 296 overlying and rigidly secured to turn with a sleeve 298 which is loosely mounted on the vertical drive shaft 274. The shaft 274 is driven alternatively at the normal rate through the worm gear 272 or at a rapid rate from the sleeve 298 through a sliding clutch member 300 keyed to the drive shaft 274, and movable lengthwise alternatively into clutching engagement with the worm gear 272 or the sleeve 298.

The position of the clutch member 300 is controlled by means of a manually operable lever 302 (see Figs. 10 and 11) secured to a rock shaft 304 which also carries one arm 306 of a toggle connection, the other arm 308 being connected to a lever 310 formed on the hub of a shifting yoke 312 pivoted on a shaft 314. A compression spring 316 coiled about the drive shaft 274 between a shoulder 318 and the upper end of the clutch member 300 tends to hold the clutch member in a depressed position in driving engagement with the worm gear 272 to drive the work spindle at the normal rate. The movement of the manually operable lever 302 to the right, as shown in Fig. 10, operates to straighten the toggle connection to raise the clutch member 300 against the pressure of the spring 316 and lock the clutch member in engagement with the rapidly rotating sleeve 298 as the toggle passes its center position.

During the testing of the work arbor and gear blank for concentricity, the control lever 158 may be placed in neutral position by the operator to disconnect the fly wheel 86 from the drive shaft 52 to arrest the reciprocation of the cutter and the relieving movements normally imparted to the work support.

In order to permit an adjustment to be readily made in the driving connections between the vertical drive shaft 274 and the work spindle 26 to take up any wear on the parts and maintain tight driving connections between the spur gears 278 and 280 and the corresponding gears 276 and 284 meshing therewith, the gears 278 and 280 are mounted for vertical adjustment on the stub shaft 282. The spur gear 278 is formed on a sleeve which is positioned vertically on the stub shaft 282 between two shims which are inserted between the ends of the sleeve and a fixed bearing 320 at the lower end of the stub shaft, and a bearing 322 screw-threaded for lengthwise adjustment in the work support at the upper end of the stub shaft 282. The spur gear 280 is keyed to the sleeve hub of the spur gear 278 to turn therewith, and is held in adjusted position lengthwise of the hub between two nuts screw-threaded onto the hub.

The mechanism through which the movable support 30 is oscillated about its pivot to impart the required feeding and relieving movements to the gear blank, as best shown in Figs. 4, 12, 13, 14, 15 and 16, comprises a feed shaft 324 which is connected to move the support 30 by the engagement of a worm 326 on the shaft with a corresponding worm gear sector 328 on the support. Feeding movements are imparted to the work support through mechanism which is arranged to rotate the feed shaft, and relieving movements are imparted thereto by mechanism which is arranged to reciprocate the feed shaft lengthwise along its axis in timed relation to each cutter stroke. To impart the required feeding movements to the work by the rotation of the feed shaft 324, a sleeve 330 is keyed to turn with the shaft, being journaled in an external bearing 332 against lengthwise movement therewith. A gear 334 is loosely mounted to turn on the sleeve 330, and is normally connected to turn therewith by the engagement of a clutch member 336 keyed to slide on the sleeve with a corresponding clutch surface formed on the hub of the gear 334.

For operating the feed to move the work blank into and out of operative position by hand, a short shaft 338 is provided (see Fig. 14) which carries at one end a bevel gear 340 arranged to mesh with a corresponding bevel gear 342 on the sleeve 330, and at its other end is shaped to receive a manually operable crank handle. The engaging surfaces of the clutch member 336 and the gear 334 are constructed with a single large tooth and a corresponding recess to permit these parts to mesh in only one angular position of the clutch member relatively to the gear 334, so that if the operator has occasion to move the work spindle manually away from the cutter, the work can be brought back quickly and accurately to its former position without disturbing the setting of the automatic feed.

To enable the operator readily to control the operation of the clutch, a shifting yoke 344 (see Fig. 13) carrying shoes to engage with a corresponding groove in the clutch member 336 is secured to a rock shaft 346 which extends forwardly through the outer casing of the machine and is provided with a manual control lever 348.

The gear 334 is actuated to automatically feed the work through connections which comprise a gear 350 meshing therewith and secured to a subsidiary feed shaft 352. A sleeve 354 loosely mounted to turn on the shaft 352 and normally connected thereto by means of a fine toothed clutch member 356, carries a pinion 358 which engages with a rack 360 formed on the vertically movable feed bar 362 (see Fig. 20), and also carries the stop dials for determining the depth of the preliminary and final cuts. The movement of the feed bar 362 to feed the work into depth is controlled by means of a piston 364 secured to the lower end of the bar and arranged to slide in a pressure cylinder 366 to which liquid under pressure is supplied to advance the bar and move the work into depth at any desired rate. The bar 362 is normally held in a depressed position by means of a compression spring 368 coiled about the upper end of the bar and seated at one end against a shoulder 370 on the bar, and at its other end against the end of the casing 372 within which the upper end of the bar and the spring are housed. The position of the fine toothed clutch 356 to maintain a driving connection between the sleeve 254 and the shaft 352, is controlled by means of a spindle 374 which is journaled within the shaft 352 and is provided with a cross bar 376 extending through corresponding slots in the shaft 352 and having its ends secured to the fine toothed clutch 356. A nut 378 threaded to the end of the sleeve 354 engages with a flange 380 on the protruding end of the spindle 374 to normally hold the clutch member 356 in locking engagement with the sleeve 354.

In order to provide an accurate mechanism for causing the work to be fed toward the cutter to the exact depth required, a dial 382 similar to the corresponding dial of the machine of applicant's prior application, is rigidly secured to the sleeve 354 and is provided with an abutment 384 as in the machine of the application, arranged to engage with a micrometer stop pin 386 on the machine frame similar to that shown in the applicant's copending application above referred to, to positively arrest the rotational feeding movements of the sleeve 354 and shaft 352 under the influence of the feed bar 362.

In order to enable the operator rapidly and certainly to set the dial mechanism for the required depth of cut, a second dial 388 similar to the corresponding dial of the machine of applicant's prior application, is loosely mounted on the sleeve 354 adjacent the dial 382, and is provided with an abutment 390 which is arranged to engage with a corresponding stop 392 on the machine frame. In setting up the machine the dial 388 is positioned relatively to the dial 382 to cause the abutment 390 to engage with the stop 392 when the sleeve 354 has been set back a distance exactly equal to the depth of cut required. Corresponding markings on the dials 382 and 388 enable the operator quickly and easily to make proper settings. To provide for a choice of either one or two preliminary cuts around the work blank, two additional dials 394 similar to the corresponding dials of the machine of applicant's prior application, are loosely mounted on the sleeve 354 adjacent the dial 388, and are provided with abutments to engage the end of a short swinging arm 395 pivotally secured to a preliminary stop lever 396 and normally held in a limiting straight position in line with the stop lever 396 by means of a spring 397. In order to lock the dial 388 and the two dials 394 in their adjusted positions on the sleeve 354 with relation to the fixed dial 382, the dials are provided with serrated faces, and are clamped securely together and to the dial 382 by means of a nut 398 screw-threaded to the sleeve.

In setting up the machine, the sleeve 354 and dial 382 are rotated to bring the abutment 384 up to rest against the micrometer stop pin 386 when the micrometer stop dial indicated at 399 on the drawings reads zero.

The clamping nut 398 is then loosened and the pitch dial 388 is disengaged from stop dial 382 and rotated to bring the desired pitch mark thereon into registration with the fixed stop 392. Should it be required to take either one or two roughing cuts in the gear blank, the dials 394 are so adjusted to the left of stop 395 that their corresponding abutments or lugs will consecutively interrupt the complete feeding movement of the mechanism in whatever proportions desired.

After the dials have been properly arranged they are clamped together through their interrelating serrated faces by the knurled nut 398 and rotated backward until abutment 390 on dial 388 rests on stop 392.

Getting the gear blank into proper position with reference to the cutter is accomplished by disengaging the clutch member 336 by raising the lever 348 and rotating the squared shaft 338 until the clutch 336 can be re-engaged at a time when the gear blank is in the nearest proximity to the cutter that the wide tooth of clutch 336 will permit. After re-engaging the clutch 336 by lowering and securing the lever 348, the knurled nut 378 is loosened thereby disengaging the fine toothed clutch 356, and the squared end of shaft 374 is rotated until the gear blank is brought into grazing contact with the cutter. The knurled nut 378 is then tightened, thereby re-engaging fine toothed clutch 356. These adjustments are made when the cutter is in its downward stroke, or in other words, when the work is in the cutting position and not in the relief position.

Subsequent fine adjustments for depth of cut, as for instance between sharpenings of the cutter, are accomplished by adjusting the micrometer dial 399.

In order to impart the required relieving movements to the work support and gear blank during each retracting stroke of the cutter, mechanism is provided for imparting lengthwise movements to the feed shaft 324 in timed relation to the vertical reciprocation of the cutter. This mechanism (see Figs. 2, 12, 15, 16 and 17) comprises a sleeve 400 loosely mounted to turn on the feed shaft 324, and secured to move lengthwise therewith by means of end thrust bearings on the shaft. The outer surface of the sleeve is screwthreaded to engage with a nut 402 which is fixed in the machine frame, so that rotational movements imparted to the sleeve 400 cause a corresponding lengthwise movement to be given to the sleeve and the feed shaft 324. These rotational movements are imparted to the sleeve 400 by the engagement of a pinion 404 on the sleeve with a rack 406 which is pivoted at one end to a slide 408, and is held in position for engagement with the pinion by means of a roll 410 engaging the opposite side of the rack bar. In order to permit a ready adjustment of this roll towards and away from the pinion 404 to hold the rack 406 tightly in engagement therewith, the roll 410 is mounted on an eccentric bearing formed on a shaft 411 journaled in the machine frame and provided with a worm gear arranged to mesh with a corresponding worm 412 on a short shaft 413 set at right angles thereto. This shaft extends through the machine frame and is provided at its outer end with a key hole arranged to receive a wrench for adjusting the roll 410 by rotating the shaft 413. The slide 408 is mounted for lengthwise movement in a slideway 414, and is provided with an arm 415 carrying a roll which engages with a cam groove 416 formed in one face of the flywheel 86, so that a reciprocatory movement is imparted to the rack 406 and to the sleeve 400 in timed relation to the reciprocation of the cutter.

For controlling the operation of the machine to cause a resumption of the feeding operation after the completion of each preliminary cut, and to automatically stop the machine after the completion of the final cut, a valve plunger is provided which is actuated by timing mechanism similar to that disclosed in the applicant's copending application hereinbefore referred to. This timing mechanism is rendered operative when the rotational feeding movement of the sleeve 354 is arrested by the engagement of the stop lever 396 with the abutment on either of the preliminary stop dials 394, or by the engagement of the stop pin 386 with the abutment 384 as the work is fed into depth, and acts after a complete revolution of the work blank to operate the valve plunger, and, through hydraulic connections hereinafter described, to bring about the required changes in the operative conditions of the machine.

The timing mechanism comprises a rotatable timing cam 417 (see Figs. 3, 5, 9 and 20) which is mounted on the upper end of a vertical shaft or spindle 418 journaled in a bracket 419 which is secured by screws 420 to the open end of a cylinder 422. A piston 424 arranged to slide within the cylinder, is mounted on the reduced lower end of the spindle 418, and is secured thereto by means of a nut 426. The cam 417 is rotated, when rendered operative, in timed relation to the rotation of the gear blank through connections including a gear 428 which is secured to the upper portion of the vertical drive shaft 274 (see Figs. 3, 5 and 9), and engages with a gear 430 formed on a sleeve 432 which is journaled in a bearing 434 concentrically with the axis of the cam 417. A flange 436 threaded to the upper end of the sleeve prevents endwise movement of the sleeve 432 and gear 430 in the bearing. Corresponding friction clutch surfaces 438 are formed on the adjacent face surfaces of the gear 430 and the cam 417, so that the cam 417 may be clutched to turn with the gear 430. A compression spring 440 mounted in a sleeve or tube 442 journaled within the sleeve 432 is arranged to bear at its upper end against an adjusting screw 444, and at its lower end against the cam 417 to maintain the cam and spindle 418 normally in their retracted position. The spindle 418 and cam 417 are raised against the pressure of the spring 440 to engage the clutch members by introducing liquid into the lower end of the cylinder 422 under sufficient pressure to overcome the force of the spring 440. The hydraulic connections, as will be hereinafter more fully explained, are arranged so that when the upward movement of the bar 396 which actuates the feed sleeve 292 is arrested, the resulting increase of pressure throughout the system increases the upward pressure exerted on the piston 424 sufficiently to overcome the pressure of the spring 440, and raises the spindle 418 and timing cam 417 to engage the clutch members 438, and thus to throw the timing cam into operation.

The timing cam 417 is turned to and held in its rest or starting position, with a raised portion of the cam in engagement with a stop or abutment 446 on the frame, by means of a cord 448, which is wrapped about, and is secured at one end to a pulley 450 formed adjacent the under face of the cam on the spindle 418, the free end of the cord being laid over a pulley 452 at the rear of the machine, and being connected to a tension spring 454 which is fastened to the machine frame. The periphery of the timing cam 417 is provided with two raised cam portions 456 and 458 placed parallel to each other and occupying the same segment of the cam, these raised portions being arranged to engage alternately with the spring-pressed valve plunger generally indicated at 460. The raised cam portion 458 occupying the lower position has a constant radius and extends around the periphery of the cam through an angle corresponding exactly to the movement of the cam while the gear blank is rotating through 360°, so that during this time the valve is held in its retracted or closed position. The upper raised cam portion 456 occupying a position parallel to that of the raised cam 458 has a radius which is at one end of the cam equal to that of the raised cam 458, but gradually decreases in radius until at the other end of the cam 456 the radius is equal to that of the low portion of the cam.

With this arrangement of the parts, it will be seen that when the cam 417 and spindle 418 are raised into operative position, the spring-pressed valve plunger 460 will be held in its depressed or closed position at one end of the raised cam 458, and will be held in this position during a rotary movement of the cam 417 corresponding to a 360° rotation of the gear blank when the plunger will drop off the high portion of the cam, thus opening the valve to render operative the connections for causing a resumption of the feeding operation or the stopping of the machine.

As the pressure in the hydraulic chamber 422 is reduced to its previous level by the resumption of the feeding movement of the bar 362, or is released entirely by the stopping of the machine at the end of the cutting operation, the piston 424 and cam 417 will be retracted under the pressure of the spring 440 to disengage the clutch members 438 and allow the cam 417 to return to its rest position under the influence of the cord 448 and spring 454. The downward movement of the cam 417 to disengage the clutch 438 causes the valve plunger 460 to be brought into engagement with and ride outwardly on the spiral cam surface 456 as the cam is rotated in a reverse direction to return the plunger 460 to its original retracted position on the high portion of the cam, and close the valve.

The valve plunger 460 is mounted to slide in a valve chamber 482 formed in a fixed portion of the machine frame, and is provided with a reduced portion which is fitted to slide in a corresponding recess in the rear end of the chamber. A compression spring 484 coiled about the reduced portion of the plunger between the end of the chamber and a shoulder on the plunger, tends to hold the plunger in engagement with the cam disk 417. Liquid under pressure is conveyed to an inlet port 486 at the inner end of the inlet pipe 488 from the pump 489 located in the base of the machine. A channel 490 in the valve member 460 is arranged, when the plunger is advanced, to permit liquid under pressure to flow through the outlet pipe line 492 to a pressure cylinder 494 to actuate the preliminary stop lever 396 and permit the continued feeding of the work. When the valve plunger is in its retracted or closed position, the inlet port is shut off, and the liquid under pressure in the outlet pipe 492 is permitted to escape through a circular channel 496 in the valve member through an outlet pipe 498 into the sump in the base of the machine.

The connections for actuating the auxiliary stop lever 396 from the pressure cylinder 494, comprises a piston 500 arranged to slide in the pressure cylinder 494, and provided with a stem which is connected through a link 502 to one end of a lever 504 pivoted intermediate its length, and at its other end connected to the rear end of the auxiliary stop lever 396.

The operation of the valve plunger 460 under the influence of the timing cam after the cutting operation has progressed through 360° about the gear blank in making the final cut, is utilized to stop the machine through connections which include a pressure cylinder 505 and piston 506 and which are arranged, when rendered operative, to cause the starting and stopping valve of the machine to be moved into stopped position. As best shown in Figs. 20, 21 and 23, the piston 506 is provided with a stem 507 having an inclined cam surface arranged to engage with a corresponding cam formed in a detent pin 508 arranged to engage with a slot 509 in the starting and stopping valve plunger 546. To maintain the plunger 546 in its open position, a compression spring 510 coiled about the detent pin 508 tends normally to hold the pin in engagement with the slot. A compression spring 511 coiled about the stem 507 of the piston 506, tends normally to hold the piston in its retracted position out of contact with the detent pin 508. When liquid under pressure is forced into the pressure cylinder 505, the piston 506 is caused to advance against the pressure of its spring 511 to withdraw the detent pin 508 and permit the starting and stopping valve to move to its off position. A manually operable lever 512 pivotally mounted on the machine and provided with a short arm 513, engages with a corresponding notch in the detent pin, so that the detent pin may be readily removed by the operator independent of the automatic mechanism above described to permit the starting and stopping valve to move to its stopped position. The pressure cylinder 505 is connected by a branch pipe line 514 and a machine controlled valve 515 to the pressure line 492 leading from the timing valve 460. The machine controlled valve 515 is arranged to slide in a valve casing 516, and is provided with an upwardly extending stem connected to one end of a stop lever 517 pivoted at 518 and provided at its other end with a bearing surface arranged to engage with the periphery of the dial 382. As the work is fed into depth, the stop lever 517 is rotated about its pivot against the pressure of a tension spring 519 attached thereto by engagement with the abutment 334 to open the valve 515, permitting liquid under pressure supplied to the pipe line 492 by the timing valve to flow through the branch pipe line 514 to the pressure cylinder 505 to throw the starting and stopping valve into stopped position as above described. When the stopping valve 515 is in its depressed or closed position during the normal operation of the machine, the liquid under pressure supplied to the pressure cylinder 505, is permitted to escape through a port 520 in the stop valve 515 to an outlet pipe 522 leading to the sump.

The liquid pressure control system herein disclosed for controlling the starting and stopping of the machine and for feeding the work into depth, utilizes as the hydraulic medium lubricating oil which is drawn from the main lubricating oil supply reservoir or sump. The oil is supplied to both the liquid pressure control system and to the lubricating system of the machine by means of the pump 489 which is driven through a sprocket chain 528 arranged to mesh with a sprocket 530 formed on the sleeve carrying the main driving pulley, and with a sprocket 532 on the driving spindle of the pump 489. The oil is forced from the pump 489 through a main supply pipe 534 which leads to the valve casing 536 which houses the valves for starting and stopping the machine and for manually controlling the operation of the feed, and through the branch inlet pipe 488 to the timing valve 460. There is also a pipe connection 538 leading from the casing 536 to the sump, a third pipe connection 539 for supplying liquid under pressure to the pressure cylinder for controlling the operation of the feed and to the pressure cylinder 422 for operating the timing mechanism. A fourth pipe connection 540 conveys liquid under pressure from the valve casing 536 to the pressure cylinders 72 and 186 for controlling respectively the operation of the starting clutch and the brake. Oil is supplied to the lubricating system of the machine through a pipe line indicated at 541 which is connected through a supply control valve 542 to the main pipe line 534, and is further provided with a relief valve 543 to permit the discharge of excess oil from the lubricating system back to the sump.

As shown in Figs. 20 to 33 inclusive, the valve casing 536 is cylindrical in shape, and is provided with a central bore 544 which is connected to the inlet or supply pipe 534, and is also provided with three recesses or bores parallel thereto for receiving respectively the main control valve 546 for controlling the automatic operation of the machine, the manually controlled feed valve 548, and the jog clutch valve 550. These valves are constructed and arranged to operate in connection with corresponding ports formed in the valve casing 536 to conduct the fluid under pressure from the central bore or inlet 544 to the pressure pipe lines 539 and 540 for controlling the starting and stopping of the machine and the feeding of the work into depth. With the valves in their off or advanced positions, as shown in Figs. 22, 23 and 24, the inlet is shut off, and the fluid under pressure in the pressure pipe lines 539 and 540 is permitted to escape through the valve ports and connecting ducts into the outlet pipe 538 leading to the sump. Compression springs 552 seated behind the valves in the casing tend to hold the valves normally in their advanced or off positions. The control valve 546 is locked in operating position against the pressure of its spring 552 when pushed in by the operator to start the machine, by means of the detent pin 508 as above described. The feed valve 548 is similarly locked in operating position against the pressure of its spring 552 by means of a latch member 553 (see Figs. 21 and 24) which is pivotally mounted on the valve casing, and is held in engagement with a corresponding notch 555 in the feed plunger by means of a small compression spring.

Figure 26:
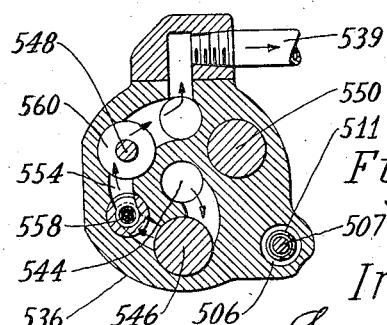
Figure 27:
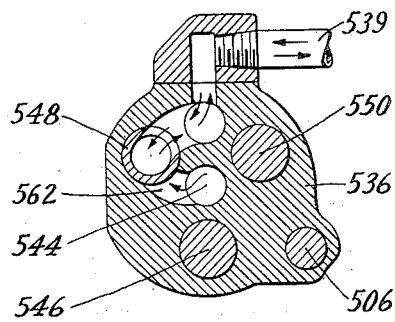
Figure 28:
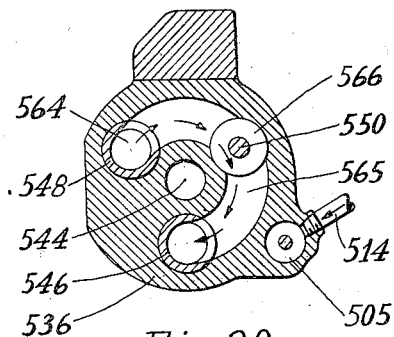
Figure 32:
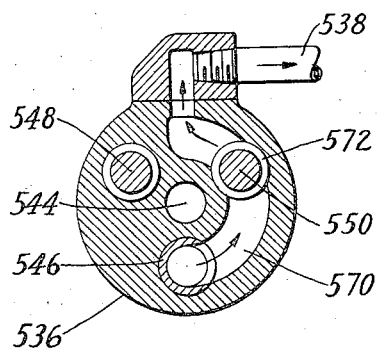
Figure 33:
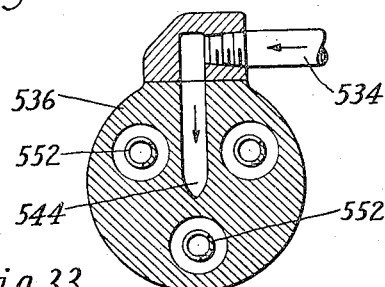

The liquid under pressure is permitted to flow from the inlet passageway or bore 544 to the pipe line 539 for the feed, upon opening the main control valve 546, through a duct designated at 554 shown in Figs. 24 and 26 flowing from the central bore 544 through an annular groove or channel 556 in the main valve, past a needle valve 558, and through an annular groove or channel 560 in the feed valve 548 to the pipe line 539 for the feed. A second duct 562 adjacent the feed duct 554 as best shown in Figs. 23, 24 and 27, leads directly from the central inlet or bore 544 to the feed valve 548, and thence to the feed pipe line 539. This duct is normally closed with the feed valve in closed position, but is opened upon movement of the feed valve inwardly by bringing the annular groove 560 into alinement with the inlet and outlet portions of the duct to provide a direct feed control for the machine. For the rest position of the machine with both the automatic and feed valves in advanced or closed positions, the liquid under pressure is permitted to drain from the feed line 539 back to the sump through a series of ducts and passageways (see Figs. 22, 23, 24 and 28) which comprise a channel 564 cut in the upper surface of the feed valve 548, which connects the outlet to the pipe line 540 with a second duct 565 which passes in a clockwise direction as best shown in Fig. 28 of the drawings, to the jog clutch valve past an annular groove 566 in the jog clutch valve 550 to one end of an annular bore or recess 567 in the main valve 546 which extends rearwardly along the axis of the valve and connects with a duct 570 adjacent the rear end of the valve casing, and extending as shown in Fig. 32 in a counter-clockwise direction past an annular groove 572 in the jog clutch valve 550 to the outlet pipe 538 leading to the sump. The movement of the main control valve 546 to open the duct 554, acts simultaneously to close the duct 564 by moving the open end of the channel 568 out of line with this duct. The movement of the feed valve 548 to open the duct 562 similarly acts to cut off the outlet from the feed pipe line 539 to the sump by moving the channel 564 out of register with the end of this duct 562.

Figure 30:
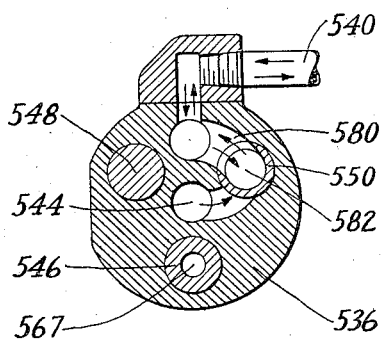
Figure 31:
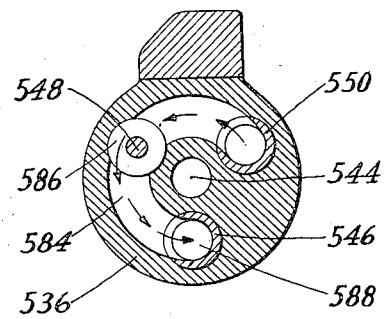
Figure 29:
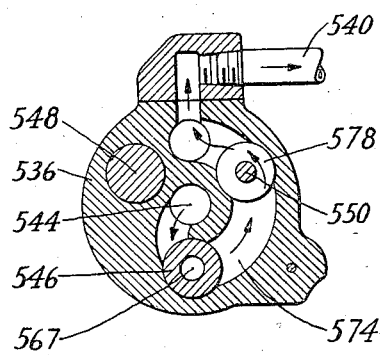

Liquid is permitted to flow under pressure from the inlet bore 544 to the pipe line 540 for closing the starting clutch and releasing the brake, upon opening the main control valve 546, through a duct 574 as shown in Figs. 22, 24 and 29, which leads from the central bore 544 past an annular groove or channel 576 in the main control valve 546 for the open position of the valve past an annular groove 578 in the jog clutch valve through the outlet to the pipe line 540. Liquid under pressure may be supplied to operate the starting clutch and to release the brake by actuation of the jog clutch valve 550 which brings the annular groove 578 into register with a duct 580, as best shown in Figs. 22 and 30, leading directly from the central inlet bore 544 to the jog clutch valve 550 and to the pipe line 540 for controlling the clutch and the brake. While the main valve 546 and the jog clutch valve 550 are in advanced or closed position, the liquid under pressure is permitted to drain from the pipe line 540 to permit the release of the clutch and the setting of the brake through a series of connecting passageways which comprise a channel 582 cut in the upper surface of the jog clutch valve to connect the pipe line 540 with a duct 584 shown in Figs. 22, 23, 24 and 31, which progresses in a counter-clockwise direction past an annular groove 586 in the feed valve to an entering port 588 in the main valve 546 connecting with the channel 568 which as above described connects through the duct 570 to the outlet pipe 538 and the sump. The movement of the main valve 546 into operative position to start the machine automatically shuts off the outlet to the sump by moving the entering port 588 out of alinement with the duct 584. Similarly, the actuation of the jog clutch valve 550 operates to shut off the outlet to the sump by moving the channel 582 out of alinement with the duct 580.

In order to regulate the rate of feed of a work support and gear blank towards the cutter during the automatic operation of the machine, an automatic feed regulating needle valve 558 as above pointed out, is located in the duct 554 to enable the operator accurately and certainly to control the rate at which liquid under pressure is fed into the feed pressure cylinder 366. This valve shown in Fig. 25, comprises a member 590 having a tapered tip arranged to seat in a corresponding valve seat 592, and is mounted in a sleeve 594 which is screw-threaded in the valve casing 536 to permit a fine regulation of the valve. A manually operable lever arm 600 secured to the sleeve 594 carries at its outer end a spring-pressed detent pin 602 which is arranged to fit in any one of a series of recesses 604 on the machine frame, so that the lever arm and sleeve 594 may be readily rotated and locked in the desired angular position.

With the present construction, the valve member 590 is mounted for a slight endwise movement in the sleeve 594, being normally held in its advanced position with a shoulder 596 in engagement with a corresponding shoulder on the sleeve by means of the compression spring 598 which bears at one end against the shoulder 596 and at its other end against an adjusting screw 597 threaded into the end of the sleeve 594. During the operation of the feeding mechanism to feed the work towards the cutter, as above described, the valve member 590 is maintained in its advanced position by the spring 598 as determined by the adjustment of the sleeve 594 to feed the work at the desired rate. When the feeding movement is arrested by the engagement of one of the stop dials with its corresponding abutment, the consequent increase of pressure in the system causes the valve member to be retracted against the pressure of its spring 598 to permit a more rapid flow of liquid through the valve, so that liquid is supplied at a comparatively rapid rate to the pressure cylinder 422 and piston 424 to move the timing mechanism into operation. The reduction in the pressure of the system which takes place as the feeding movement of the feed bar 362 is again resumed after the actuation of the preliminary stop lever 396, permits the feed regulating valve member 590 to be again advanced under the pressure of the spring to its normal operating position to control the rate of feed. This construction of the regulating feed valve, by permitting an increased flow of liquid through the system during the operation of the timing mechanism, results in a considerable saving in the time required to bring the timing mechanism into operation.

Inasmuch as it may be desirable under some circumstances, as for instance, where the cutting of the gear has been partially completed and has then been backed off from the cutter, to feed the work back into operative position as rapidly as possible, a manually controlled trip mechanism is provided in the present construction, which may be operated to move the preliminary stop lever 396 out of operative position to prevent the interruption of the feed, and thus to prevent the timing mechanism from being thrown into operation while the work is being brought back into position. This trip mechanism comprises a valve 608 which is arranged to slide in a valve casing 610, and is provided with an annular groove 612 arranged for one position of the valve to form a continuous passage for the pipe line 492 and for the other position of the valve to connect the lower portion of the pipe line 492 directly with an inlet 614 from the main supply line 488 from the pump, while at the same time cutting off that portion of the line 492 leading from the timing valve 460. When the trip valve 608 is pushed inwardly or to the right as shown in Fig. 20, oil under pressure is supplied directly from the pressure line 488, and causes the piston 500 to be depressed to move and hold the preliminary stop lever 396 out of the line of travel of the stops on the preliminary stop dials 394, so that the work may be rapidly moved back into the desired operative position.

The operation of the machine has been indicated in connection with the description of the construction and arrangement of its parts, and will be readily understood without a separate description thereof.

The nature and scope of the invention having been indicated and a machine embodying the several features of the invention having been specifically described, what is claimed is:

1. A gear generating machine having, in combination, a gear formed planing cutter, a work spindle arranged to carry a circular gear blank, means for imparting relative reciprocatory cutting movements to the cutter and the blank, a main driving transmission, branch line transmissions for rotating the work spindle and cutter arranged to maintain a substantially equal peripheral speed between the cutter and gear blank, a branch transmission for rotating the work spindle at a substantially higher rate, and a clutch arranged to engage alternatively the two branch line transmissions for rotating the work spindle.

2. A gear generating machine having, in combination, a gear formed planing cutter, a work spindle arranged to carry a circular gear blank, means for imparting relative reciprocatory cutting movements to the cutter and the blank, a main driving transmission, branch line transmission for rotating the work spindle and cutter arranged to maintain a substantially equal peripheral speed between the cutter and gear blank, a branch transmission for rotating the work spindle at a substantially higher rate, a clutch arranged to engage alternatively the two branch line transmissions for rotating the work spindle, spring means tending to hold the clutch in one of said alternative positions, and manually operable connections for operating the clutch including a toggle arranged when straightened to lock the clutch in the other of said alternative positions against the pressure of the spring.

3. A gear generating machine having, in combination, a gear formed planing cutter, a work spindle arranged to carry a circular gear blank, means for imparting relative rotational movements to the cutter and blank arranged to maintain a substantially equal peripheral speed at the point of cutting contact, means for imparting relative reciprocatory cutting movements to the cutter and the blank, a support on which one of said elements is carried pivoted for movement to permit relative feeding movements of the cutter and gear blank into depth, a feed shaft, a worm on the shaft, a worm gear segment engaging therewith formed on the pivoted support, and means for rotating the shaft to impart the said feeding movements.

4. A gear generating machine, having, in combination, a gear formed planing cutter, a work spindle arranged to carry a circular gear blank, means for imparting relative reciprocatory cutting movements to the cutter and blank, a support for one of said elements pivoted for movement about a fixed pivot to impart the required relative feeding and relieving movements to the cutter and work blank, a feed shaft, means for rotating the shaft, connections between the feed shaft and the pivoted support actuated by the rotational movements of the feed shaft to impart the required feeding movements to the said support about its pivot, and means for imparting lengthwise movements to said shaft in timed relation to the reciprocation of the cutter to impart the required relieving movements to said support.

5. A gear generating machine having, in combination, a gear formed planing cutter, a work spindle arranged to carry a circular gear blank, means for imparting relative rotational movements to the cutter and blank arranged to maintain a substantially equal peripheral speed at the point of contact, means for imparting relative reciprocatory cutting movements to the cutter and blank, a support for one of said elements movable to impart the required relative feeding and relieving movements to the cutter and work blank, a feed shaft, means for rotating the shaft, connections between the feed shaft and the movable support actuated by the rotational movements of the feed shaft to impart the required feeding movements to the said support, and means for imparting lengthwise movements to said shaft in timed relation to the reciprocation of the cutter to impart the required relieving movements to said support.

6. A gear generating machine having, in combination, a gear formed planing cutter, a work spindle for supporting a gear blank, means for imparting relative reciprocatory cutting movements to the cutter and the blank, means for imparting rotational movements to the cutter and spindle arranged to maintain a substantially equal peripheral speed between the cutter and the gear blank, a support on which one of said elements is mounted movable to impart the required relative feeding and relieving movements to the cutter and work blank, a feed shaft, means for rotating the feed shaft, connections including a worm through which the rotational movements of the feed shaft are caused to advance the said support, and mechanism including a screw and nut arranged to impart lengthwise movements to the feed shaft in timed relation to the reciprocation of the cutter to give the required relieving movements to the support.

7. A gear generating machine having, in combination, a gear formed planing cutter, a work spindle for supporting a gear blank, means including a flywheel for imparting relative reciprocatory cutting movements to the cutter and the blank, means for imparting rotational movements to the cutter and spindle arranged to maintain a substantially equal peripheral speed between the cutter and the gear blank, a support on which one of said elements is mounted movable to impart the required relative feeding and relieving movements to the cutter and work blank, a feed shaft, means for rotating the feed shaft, connections including a worm through which the rotational movements of the feed shaft are caused to advance the said support, and mechanism including a screw, a nut, and a rack connected to said fly-wheel arranged to impart lengthwise movements to the feed shaft in timed relation to the reciprocation of the cutter to give the required relieving movements to the support.

8. A gear generating machine having, in combination, a gear formed planing cutter, a work spindle for supporting a gear blank, means for imparting relative reciprocatory cutting movements to the cutter and the blank, means for imparting rotational movements to the cutter and spindle arranged to maintain a substantially equal peripheral speed between the cutter and the gear blank, a support on which one of said elements is mounted movable to impart the required relative feeding and relieving movements to the cutter and work blank, a feed shaft, connections including a worm through which rotational movements of the feed shaft are caused to impart feeding movements to said support, driving connections for rotating the feed shaft including a coarse tooth clutch, a fine tooth clutch, and means for manually rotating said feed shaft upon disconnecting one of said clutches.

9. A gear generating machine having, in combination, a gear formed planing cutter, a work spindle for supporting a gear blank, means for imparting relative reciprocatory cutting movements to the cutter and the blank, means for imparting rotational movements to the cutter and spindle arranged to maintain a substantially equal peripheral speed between the cutter and the gear blank, a support on which one of said elements is mounted movable to impart the required relative feeding and relieving movements to the cutter and work blank, a feed shaft, connections including a worm through which rotational movements of the feed shaft are caused to impart feeding movements to said support, driving connections including a clutch having clutch surfaces engaging for one angular position only of said surfaces relatively to each other, a second clutch in series therewith having clutch surfaces arranged to engage in a plurality of relative angular positions to permit a fine adjustment of the angular position of said surfaces, and means for manually rotating said feed shaft upon disconnecting one of said clutches.

10. A gear generating machine having, in combination, a gear formed planing cutter, a work spindle for supporting a gear blank, means for imparting relative reciprocatory cutting movements to the cutter and the blank, means for imparting rotational movements to the cutter and spindle arranged to maintain a substantially equal peripheral speed between the cutter and the gear blank, a support on which one of said elements is mounted movable to impart the required relative feeding and relieving movements to the cutter and work blank, a feed shaft, connections including a worm through which rotational movements of the feed shaft are caused to impart feeding movements to said support, driving connections for rotating the feed shaft including a coarse tooth clutch, a fine tooth clutch, means for manually rotating said feed shaft upon disconnecting one of said clutches, and mechanism including a screw and nut arranged to impart lengthwise movements to the feed shaft in timed relation to the reciprocation of the cutter to give the required relieving movements to the support.

11. A gear generating machine having, in combination, a gear formed planing cutter, a work spindle for supporting a gear blank, means for imparting relative reciprocatory cutting movements to the cutter and the blank, means for imparting rotational movements to the cutter and spindle arranged to maintain a substantially equal peripheral speed between the cutter and the gear blank, a support on which one of said elements is mounted movable to impart the required relative feeding and relieving movements to the cutter and work blank, connections for imparting feeding movements to the support including a feed shaft, a worm on said shaft, a worm gear segment on the support engaging said worm, a lengthwise movable rack arranged to rotate said shaft to impart feeding movements to the support, and mechanism including a nut, and a screw sleeved on the feed shaft and supported against endwise movement relatively thereto, and a lengthwise movable rack for relatively moving said screw and nut to impart lengthwise movements to the feed shaft in timed relation to the reciprocation of the cutter to give the required relieving movements to the support.

12. A gear generating machine having, in combination, a gear formed planing cutter, a work spindle arranged to carry a circular gear blank, mechanism including a fly-wheel for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, a main clutch through which power is transmitted to the machine including the flywheel, a braking mechanism for arresting the rotation of the flywheel, and a fluid pressure control system comprising a branch pressure line for controlling the operation of said clutch arranged upon applying the pressure to close the clutch and upon exhaustion of the pressure to release the clutch, a branch pressure line for controlling the operation of the braking mechanism arranged upon applying said pressure to release the brake and upon exhausting the pressure to set the brake, and a control valve for controlling the application of the pressure simultaneously to each of said branch lines to operate the brake and the clutch.

13. A gear generating machine having, in combination, a gear formed planing cutter, a work spindle arranged to carry a circular gear blank, mechanism including a flywheel for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, a main clutch through which power is transmitted to the machine including the flywheel, a braking mechanism for arresting the rotation of the flywheel, and a liquid pressure control system comprising a pressure cylinder for controlling the operation of the clutch, a second pressure cylinder for controlling the operation of the brake, and a control valve to apply said liquid pressure simultaneously to each of said cylinders to release the brake and close the clutch and to exhaust said pressure to simultaneously open the clutch and set the brake.

14. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, a main clutch through which power is transmitted to the machine, a braking mechanism for stopping the machine, spring means tending to maintain said clutch in open position, spring means tending to set the brake, and a fluid pressure control system comprising branch pressure lines including pressure operated pistons arranged respectively upon applying said pressure to close the clutch and release the brake and upon exhausting said pressure to permit the opening of the clutch and setting of the brake by said spring means, and a control valve arranged alternatively to apply and to exhaust the pressure simultaneously in said branch lines.

15. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and the blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system controlling the operation of the machine including a main starting and stopping valve, means tending normally to hold the valve in off position, a detent for holding the valve in running position, a member actuated by fluid pressure to withdraw said detent, and means actuated at the end of the gear shaping operation to supply liquid pressure for operating the detent to cause the return of said starting and stopping valve to off position.

16. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system controlling the operation of the machine comprising mechanism operated by said fluid pressure to relatively advance the supports to feed the cutter into depth with relation to the blank, a preliminary stop for stopping the relative feeding movements of the supports to form a preliminary cut around the blank, fluid pressure connections for moving said stop out of operative position, and a manual control for said fluid pressure connections operative to remove said stop and permit the uninterrupted feed of the cutter towards the blank.

17. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for controlling the operation of the machine comprising mechanism operated by said fluid pressure to relatively advance the supports to bring the cutter into cutting engagement with the blank, an intermediate stop for positively stopping the relative feeding movements of the supports, a timing mechanism rendered operative by the engagement of said stop arranged to remove the stop after a complete revolution of the cutting operation about the gear blank, and a trip mechanism manually operable during the operation of the machine for moving the stop out of operative position independently of said timing mechanism to permit the uninterrupted continuation of said feeding movements.

18. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank arranged to maintain a substantially equal peripheral speed at the point of cutting contact, supports on which said elements are mounted relatively movable laterally of said cutting movements to bring the cutter and gear blank into and out of operative engagement, and a fluid pressure control system controlling the operation of the machine comprising mechanism operated by said fluid pressure to relatively advance the supports to bring the cutter into cutting engagement with the blank, a stop for positively limiting the depth of feed, an intermediate stop for stopping the relative feeding movements of the supports, means actuated by fluid pressure to move said intermediate stop out of operative position, and a timing mechanism rendered operative upon arresting the relative feeding movements of the supports to cause said fluid pressure actuated means to move said intermediate stop out of operative position after a complete revolution of the cutting operation about the gear blank.

19. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system controlling the operation of the machine comprising mechanism operated by said fluid pressure to relatively advance the supports to bring the cutter into cutting engagement with the blank, a stop for positively limiting the depth of feed, an intermediate stop for stopping the relative feeding movements of the supports, means actuated by fluid pressure to move said intermediate stop out of operative position, means operated by fluid pressure to stop the machine, and a timing mechanism rendered operative upon stopping of the relative feeding movements of the supports to cause the preliminary stop to be moved by the fluid pressure actuated means out of operative position after a complete revolution of the cutting operation about the gear blank, and rendered operative upon engagement of the feeding mechanism with the final stop to cause the machine to be stopped by said fluid pressure actuated means after a complete revolution of the cutting operation about the gear blank.

20. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for controlling the operation of the machine comprising mechanism operated by said fluid pressure to relatively advance the supports to feed the cutter into depth with relation to the blank, a preliminary stop for positively stopping the relative feeding movements of the supports, and a timing mechanism including a timing valve rendered operative at the completion of a preliminary cut and acting through hydraulic connections to remove said preliminary stop from operative position.

21. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for controlling the operation of the machine comprising mechanism operated by said fluid pressure to relatively advance the supports to feed the cutter into depth with relation to the blank, a preliminary stop for positively stopping the relative feeding movements of the supports, a timing mechanism including a timing valve rendered operative at the completion of a preliminary cut and acting through hydraulic connections to remove said preliminary stop from operative position, and hydraulic connections from said timing valve rendered operative upon completion of a final cut to stop the machine.

22. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for controlling the operation of the machine comprising mechanism rendered operative by said fluid pressure to relatively advance the supports to feed the cutter into depth with relation to the blank, a starting and stopping valve, hydraulic connections acting when rendered operative to move the starting and stopping valve to off position, a machine controlled valve rendered operative upon the feeding of the work into depth to permit a flow of liquid under pressure to said hydraulic connections, and a timing mechanism including a timing valve rendered operative after the completion of a cut around the gear blank to permit the flow of liquid under pressure through said machine control valve to said hydraulic connections.

23. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for controlling the operation of the machine comprising mechanism operated by said fluid pressure to relatively advance the supports to bring the cutter into cutting engagement with the blank, a stop for positively stopping the relative feeding movements of the supports, a timing mechanism rendered operative by the increased pressure in the system resulting from the stopping of the feed, and a feed regulating valve for determining the rate of feed arranged to permit an increased flow of the liquid under pressure to accelerate the operation of said timing mechanism.

24. A gear generating machine having, in combination, a gear formed planing cutter, a work spindle arranged to carry a circular gear blank, mechanism for imparting a relative reciprocatory cutting movement to the cutter and the blank, means for importing relative rotational movements to the cutter and blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for controlling the operation of the machine comprising mechanism operated by said fluid pressure to relatively advance the supports to bring the cutter into cutting engagement with the blank, a stop for positively stopping the relative feeding movements of the supports, a timing mechanism rendered operative by the increased pressure in the system resulting from the stopping of the feed, a feed regulating valve, and a spring arranged to hold the valve in adjusted position during the feeding of the work, and yielding under said increased pressure to permit the valve to move away from its seat and accelerate the flow of liquid under pressure to accelerate the operation of said timing mechanism.

25. A gear generating machine having, in combination, a gear formed planing cutter, a work spindle arranged to carry a circular gear blank, means for imparting relative rotational movements to the cutter and blank and arranged to maintain a substantially equal peripheral speed at the point of cutting contact, supports on which said elements are mounted relatively movable laterally of the cutting movements to bring the cutter and gear blank into and out of operative engagement, and mechanism for imparting a relative reciprocatory cutting movement to the cutter and the blank comprising a flywheel, a screw-threaded member extending diametrically across one face of the flywheel, a crank pin having screw-threaded engagement with said screw-threaded member, and two worms engaging with corresponding worm wheels on each end of said screw-threaded member to provide adjusting and locking means for positioning the crank pin on the flywheel.

26. A gear generating machine having, in combination, a gear formed planing cutter, a work spindle for supporting a gear blank, means for imparting relative reciprocatory cutting movements to the cutter and blank, means for imparting rotational movements to the cutter and spindle arranged to maintain a substantially equal peripheral speed between the cutter and the gear blank, a support on which one of said elements is mounted movable to impart the required relative feed and relieving movements to the cutter and work blank, a feed shaft, means for rotating the feed shaft, connections through which the rotational movements of the feed shaft are caused to advance the said support, mechanism for imparting lengthwise movements to the feed shaft in timed relation to the reciprocation of the cutter to give the required relieving movements to the support comprising a gear, a rack engaging the gear, means for reciprocating the rack, a roll engaging the rack to hold said rack in engagement with the gear, a spindle having an eccentric bearing for the roll, a worm wheel on the spindle and a worm engaging the worm wheel for adjusting the angular position of the spindle.

27. A gear generating machine having, in combination, a gear formed planing cutter, a work spindle for supporting the gear blank, means for imparting relative reciprocatory cutting movements to the cutter and the blank, means for imparting rotational movements to the cutter and spindle arranged to maintain a substantially equal peripheral speed between the cutter and the gear blank, supports on which the said elements are mounted relatively movable to impart the required relative feeding and relieving movements to the cutter and the work blank, a main clutch through which the machine is driven, connections operated by fluid pressure for imparting relative feeding movements to the supports, connections operated by fluid pressure for connecting and disconnecting the machine clutch, and control devices for said fluid pressure actuated connections comprising a valve casing, an inlet passage to said casing, outlet passages from said casing to said fluid pressure operated feed and clutch connections, a main starting and stopping valve arranged, when rendered operative, to permit fluid under pressure to flow simultaneously from the said inlet passageway through ducts in the casing to said feed and clutch outlet passageways, a clutch valve in said casing arranged, when rendered operative, to permit fluid under pressure to flow from the inlet passageway through a duct in the casing to said clutch outlet passageway, and a feed valve in said casing arranged, when rendered operative to permit fluid under pressure to flow from said inlet passageway through a duct in the casing to said feed outlet passageway.

28. A gear generating machine having, in combination, a gear formed planing cutter, a work spindle for supporting the gear blank, means for imparting relative reciprocatory cutting movements to the cutter and the blank, means for imparting rotational movements to the cutter and spindle arranged to maintain a substantially equal peripheral speed between the cutter and the gear blank, supports on which said elements are mounted relatively movable to impart the required relative feeding and relieving movements to the cutter and the work blank, a main clutch through which the machine is driven, connections operated by fluid pressure for imparting relative feeding movements to the supports, connections operated by fluid pressure for connecting and disconnecting the machine clutch, and control devices for said fluid pressure actuated connections comprising a valve casing, an inlet passageway in said casing, outlet passageways in said casing to the clutch and feed actuating connections, a feed valve in said casing arranged, when rendered operative, to permit fluid under pressure to flow from said inlet passageway through ducts in the casing to said feed outlet passageway, a clutch valve in said casing arranged, when rendered operative, to permit fluid under pressure to flow through ducts in the casing to said clutch outlet passageway, a feed regulating valve in the casing, and a main starting and stopping valve in the casing arranged, when rendered operative, to permit fluid under pressure to flow through a duct in the casing through said feed regulating valve to said feed outlet passageway and simultaneously through a duct in the casing to said clutch outlet passageway.

29. A gear generating machine having, in combination, a gear formed planing cutter, a work spindle for supporting the gear blank, means for imparting relative reciprocatory cutting movements to the cutter and the blank, means for imparting rotational movements to the cutter and spindle arranged to maintain a substantially equal peripheral speed between the cutter and the gear blank, supports on which said elements are mounted relatively movable to impart the required relative feeding and relieving movements to the cutter and the work blank, a main clutch through which the machine is driven, connections operated by fluid pressure for imparting relative feeding movements to the supports, connections operated by fluid pressure for connecting and disconnecting the machine clutch, and control devices for said fluid pressure actuated connections comprising a valve casing, an inlet passageway in said casing, an outlet exhaust passageway in said casing, outlet passageways in said casing to the clutch and feed actuating connections, a feed valve in said casing arranged in off position to permit fluid to flow through ducts in the casing from said feed outlet passageway to the exhaust outlet passageway, and when rendered operative, to permit fluid under pressure to flow from said inlet passageway to the feed outlet passageway, a clutch valve in said casing arranged in off position to permit fluid to flow from said clutch outlet passageway to the exhaust outlet passageway and, when rendered operative, to permit fluid under pressure to flow from said inlet passageway to said clutch outlet passageway, and a main starting and stopping valve in said casing arranged, when rendered operative, to close said exhaust outlet passageway and to permit fluid under pressure to flow from said inlet passageway simultaneously to said clutch and said feed outlet passageway.

30. A gear generating machine having, in combination, a gear formed planing cutter, a work spindle arranged to carry a circular gear blank, a main driving member, connections from said driving member including a clutch mechanism for imparting relative rotational movements to the cutter and the work spindle arranged to maintain a substantially equal peripheral speed between the cutter and the gear blank at the point of contact, connections from said member for imparting relative reciprocatory cutting movements to the cutter and gear blank, branch connections from said main driving member to rotate the work spindle alternatively at a faster rate, and mechanism to arrest said reciprocatory cutting movements during said high speed reciprocation.

31. A gear generating machine having, in combination, a gear formed planing cutter, a work spindle arranged to carry a circular gear blank, a main driving shaft, connections from said shaft for imparting relative rotational movements to the cutter and the work spindle arranged to maintain a substantially equal peripheral speed between the cutter and the gear blank at the point of contact, a flywheel driven from said shaft connected to impart relative reciprocatory cutting movements to the cutter and the gear blank and to impart relieving movements thereto during each cutter return stroke, driving connections from said shaft acting when rendered operative to rotate the work spindle at a substantially faster rate, and clutch mechanism arranged to permit the disconnecting of said flywheel from said drive shaft during said high speed reciprocation.

32. A gear generating machine having, in combination, a gear shaped planing cutter, a support on which the cutter is mounted for reciprocatory cutting movements across the face of the gear blank, a work spindle on which the gear blank is supported, a support on which the work spindle is carried pivotally mounted on a fixed pivot to permit movements of the gear blank toward and away from the cutter, and mechanism for imparting relative rotational movements to the cutter and the work spindle to maintain a substantially equal peripheral speed of the cutter and work blank including a shaft mounted co-axially with the pivoted support, worm and worm gear driving connections for said shaft, two tapered spur gears for transmitting rotational movements from said shaft to said work spindle, a compound idler gear comprising two tapered spur gears meshing with said first-mentioned gears and secured to turn together on the same axis, and means for adjusting each of said compound idler gears axially to eliminate back-lash in said train of gears.

33. A gear generating machine having, in combination, a gear-shaped planing cutter, a cutter spindle, a work spindle arranged to carry a circular gear blank, means for imparting relative reciprocatory cutting movements to the cutter and blank, a support for one of said spindles mounted to swing laterally about a fixed pivot to impart relative movements to the cutter and blank into and out of operative engagement, and means for imparting relative rotational movements to the cutter and the work spindle comprising a drive shaft mounted co-axially with said pivot, two oppositely tapered gears mounted to rotate in parallel planes for transmitting motion from said drive shaft to the one of said cutter and work spindles mounted on said support, and a compound idler comprising two tapered gears engaging with said first-mentioned gears and secured to turn together on a single axis on said support, and means for adjusting the positions of said compound idler gears axially to eliminate backlash in said train of gears.

34. A gear generating machine having, in combination, a gear-shaped planing cutter, a cutter spindle, a work spindle arranged to carry a circular gear blank, means for imparting relative reciprocatory cutting movements to the cutter and blank, a support for one of said spindles mounted to swing laterally about a fixed pivot to impart relative movements to the cutter and blank into and out of operative engagement, and means for imparting relative rotational movements to the cutter and the work spindle comprising a drive shaft mounted co-axially with said pivot, two oppositely tapered gears mounted to rotate in parallel planes for transmitting motion from said drive shaft to the one of said cutter and work spindles mounted on said support, and a compound idler comprising a tapered gear having a sleeve hub, an oppositely tapered gear keyed to said sleeve hub, means for adjusting the position of said latter gear axially on the sleeve hub, and means for adjusting the sleeve gear axially to eliminate backlash in said connections.

35. A gear generating machine having, in combination, a gear formed planing cutter, a work spindle arranged to carry a circular gear blank, mechanism for imparting a relative reciprocatory cutting movement to the cutter and the blank, means for imparting relative rotational movements to the cutter and the blank and arranged to maintain a substantially equal peripheral speed at the point of cutting contact, supports on which said elements are mounted relatively movable laterally of said cutting movements to bring the cutter and gear blank into and out of operative engagement, and a fluid pressure control system for the machine comprising a fluid pressure supply line, a branch pressure line arranged to control the starting and stopping of the machine, a branch pressure line arranged to control the operation of feeding the work relatively to the cutter, a main starting and stopping valve arranged to control the supply of pressure to both of said branch lines, a valve to control the rate of feed in line with said main valve, and an additional valve arranged to admit pressure to said branch feed line independently of said feed control valve during the continued operation of said main valve to accelerate the rate of feed.

36. A gear generating machine having, in combination, a gear formed planing cutter, a work spindle for supporting the gear blank, means for imparting relative reciprocatory cutting movements to the cutter and the gear blank, means for imparting rotational movements to the cutter and spindle arranged to maintain a substantially equal peripheral speed between the cutter and the gear blank, supports on which the said elements are mounted relatively movable to impart the required relative feeding and relieving movements to the cutter and the work blank, a main clutch through which the machine is driven, connections operated by fluid pressure to impart relative feeding movements to the supports, connections operated by fluid pressure for connecting and disconnecting the machine clutch, and control devices for said fluid pressure actuated connections comprising a main starting and stopping valve, a feed valve, a clutch valve, an inlet passage connected to said valves, outlet passages from said valves to said fluid pressure operated feed and clutch connections, an exhaust passageway connected through said valves to exhaust the fluid in said outlet passageways, and passageways interconnecting said valves so arranged that the opening of any one of said control valves will automatically cut off the exhaust passageway from each of said outlet passageways.

37. A gear generating machine having, in combination, a gear formed planing cutter, a work spindle for supporting the gear blank, means for imparting relative reciprocatory cutting movements to the cutter and the gear blank, means for imparting rotational movements to the cutter and spindle arranged to maintain a substantially equal peripheral speed between the cutter and the gear blank, supports on which the said elements are mounted relatively movable to impart the required relative feeding and relieving movements to the cutter and the work blank, a main clutch through which the machine is driven, connections operated by fluid pressure to impart relative feeding movements to the supports, connections operated by fluid pressure for connecting and disconnecting the machine clutch, and control devices for said fluid pressure actuated connections comprising a valve casing, an inlet passage to said casing, outlet passages from said casing to said fluid pressure operated feed and clutch connections, an exhaust passageway from said casing connecting with said outlet passages, a main starting and stopping valve arranged when rendered operative to shut off said exhaust passageway and permit fluid under pressure to flow simultaneously from the said inlet passageway through ducts in the casing to said feed and clutch outlet passageways, a clutch valve in said casing arranged when rendered operative to shut off the exhaust passageway from said clutch outlet passageway and permit fluid under pressure to flow from the inlet passageway through a duct in the casing to said clutch outlet passageway, and a feed valve in said casing arranged when rendered operative to shut off the exhaust passageway from said feed outlet passageway and permit fluid under pressure to flow from said inlet passageway through a duct in the casing to the feed outlet passageway.

SAMUEL W. AVIS.